United States Patent
Schwarm

(10) Patent No.: US 7,356,377 B2
(45) Date of Patent: Apr. 8, 2008

(54) SYSTEM, METHOD, AND MEDIUM FOR MONITORING PERFORMANCE OF AN ADVANCED PROCESS CONTROL SYSTEM

(75) Inventor: Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 484 days.

(21) Appl. No.: 10/765,921

(22) Filed: Jan. 29, 2004

(65) Prior Publication Data

US 2005/0171626 A1    Aug. 4, 2005

(51) Int. Cl.
G06F 19/00 (2006.01)

(52) U.S. Cl. .................... 700/108; 700/31; 700/121

(58) Field of Classification Search ............ 700/29–31, 700/51, 52, 108–111, 121; 702/81–84, 181, 702/182; 703/2, 6
See application file for complete search history.

(56) References Cited

U.S. PATENT DOCUMENTS

| | | | |
|---|---|---|---|
| 3,205,485 A | 9/1965 | Noltingk | |
| 3,229,198 A | 1/1966 | Libby | |
| 3,767,900 A | 10/1973 | Chao et al. | |
| 3,920,965 A | 11/1975 | Sohrwardy | |
| 3,982,440 A | * 9/1976 | Groleau et al. | ............ 73/865.8 |
| 4,000,458 A | 12/1976 | Miller et al. | |
| 4,207,520 A | 6/1980 | Flora et al. | |
| 4,209,744 A | 6/1980 | Gerasimov et al. | |
| 4,302,721 A | 11/1981 | Urbanek et al. | |
| 4,368,510 A | 1/1983 | Anderson | |
| 4,609,870 A | 9/1986 | Lale et al. | |
| 4,616,308 A | 10/1986 | Morshedi et al. | |
| 4,663,703 A | 5/1987 | Axelby et al. | |
| 4,698,766 A | 10/1987 | Entwistle et al. | |
| 4,750,141 A | 6/1988 | Judell et al. | |
| 4,755,753 A | 7/1988 | Chern | |

(Continued)

FOREIGN PATENT DOCUMENTS

CA    2050247    8/1991

(Continued)

OTHER PUBLICATIONS

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43-51.

(Continued)

*Primary Examiner*—Leo Picard
*Assistant Examiner*—Sean Shechtman
(74) *Attorney, Agent, or Firm*—Wilmer Cutler Pickering Hale & Dorr

(57) ABSTRACT

A method for monitoring performance of an advanced process control system for at least one process output includes calculating a variance of a prediction error for a processing performance and/or a probability for violating specification limits of the processing performance of the at least one process output. If the variance of the prediction error is calculated, the method also includes calculating a model health index. If the probability for violating specification limits is calculated, the method further includes calculating a process health index.

53 Claims, 11 Drawing Sheets

U.S. PATENT DOCUMENTS

| | | | |
|---|---|---|---|
| 4,757,259 A | 7/1988 | Charpentier | |
| 4,796,194 A | 1/1989 | Atherton | |
| 4,901,218 A | 2/1990 | Cornwell | |
| 4,938,600 A | 7/1990 | Into | |
| 4,957,605 A | 9/1990 | Hurwitt et al. | |
| 4,967,381 A | 10/1990 | Lane et al. | |
| 5,089,970 A | 2/1992 | Lee et al. | |
| 5,108,570 A | 4/1992 | Wang | |
| 5,208,765 A | 5/1993 | Turnbull | |
| 5,220,517 A | 6/1993 | Sierk et al. | |
| 5,226,118 A | 7/1993 | Baker et al. | |
| 5,231,585 A | 7/1993 | Kobayashi et al. | |
| 5,236,868 A | 8/1993 | Nulman | |
| 5,240,552 A | 8/1993 | Yu et al. | |
| 5,260,868 A | 11/1993 | Gupta et al. | |
| 5,270,222 A | 12/1993 | Moslehi | |
| 5,283,141 A | 2/1994 | Yoon et al. | |
| 5,295,242 A | 3/1994 | Mashruwala et al. | |
| 5,309,221 A | 5/1994 | Fischer et al. | |
| 5,329,463 A | 7/1994 | Sierk et al. | |
| 5,338,630 A | 8/1994 | Yoon et al. | |
| 5,347,446 A | 9/1994 | Iino et al. | |
| 5,367,624 A | 11/1994 | Cooper | |
| 5,369,544 A | 11/1994 | Mastrangelo | |
| 5,375,064 A | 12/1994 | Bollinger | |
| 5,398,336 A | 3/1995 | Tantry et al. | |
| 5,402,367 A | 3/1995 | Sullivan et al. | |
| 5,408,405 A | 4/1995 | Mozumder et al. | |
| 5,410,473 A | 4/1995 | Kaneko et al. | |
| 5,420,796 A | 5/1995 | Weling et al. | |
| 5,427,878 A | 6/1995 | Corliss | |
| 5,444,837 A | 8/1995 | Bomans et al. | |
| 5,469,361 A | 11/1995 | Moyne | |
| 5,485,082 A | 1/1996 | Wisspeintner et al. | |
| 5,490,097 A | 2/1996 | Swenson et al. | |
| 5,495,417 A | 2/1996 | Fuduka et al. | |
| 5,497,316 A | 3/1996 | Sierk et al. | |
| 5,497,381 A | 3/1996 | O'Donoghue et al. | |
| 5,503,707 A | 4/1996 | Maung et al. | |
| 5,508,947 A | 4/1996 | Sierk et al. | |
| 5,511,005 A | 4/1996 | Abbe et al. | |
| 5,519,605 A | 5/1996 | Cawlfield | |
| 5,525,808 A | 6/1996 | Irie et al. | |
| 5,526,293 A | 6/1996 | Mozumder et al. | |
| 5,534,289 A | 7/1996 | Bilder et al. | |
| 5,541,510 A | 7/1996 | Danielson | |
| 5,546,312 A | 8/1996 | Mozumder et al. | |
| 5,548,535 A * | 8/1996 | Zvonar | 702/81 |
| 5,553,195 A | 9/1996 | Meijer | |
| 5,586,039 A | 12/1996 | Hirsch et al. | |
| 5,599,423 A | 2/1997 | Parker et al. | |
| 5,602,492 A | 2/1997 | Cresswell et al. | |
| 5,603,707 A | 2/1997 | Trombetta et al. | |
| 5,617,023 A | 4/1997 | Skalski | |
| 5,627,083 A | 5/1997 | Tounai | |
| 5,629,216 A | 5/1997 | Wijaranakula et al. | |
| 5,642,296 A | 6/1997 | Saxena | |
| 5,646,870 A | 7/1997 | Krivokapic et al. | |
| 5,649,169 A | 7/1997 | Berezin et al. | |
| 5,654,903 A | 8/1997 | Reitman et al. | |
| 5,655,951 A | 8/1997 | Meikle et al. | |
| 5,657,254 A | 8/1997 | Sierk et al. | |
| 5,661,669 A | 8/1997 | Mozumder et al. | |
| 5,663,797 A | 9/1997 | Sandhu | |
| 5,664,987 A | 9/1997 | Renteln | |
| 5,665,199 A | 9/1997 | Sahota et al. | |
| 5,665,214 A | 9/1997 | Iturralde | |
| 5,666,297 A | 9/1997 | Britt et al. | |
| 5,667,424 A | 9/1997 | Pan | |
| 5,674,787 A | 10/1997 | Zhao et al. | |
| 5,694,325 A | 12/1997 | Fukuda et al. | |
| 5,695,810 A | 12/1997 | Dubin et al. | |
| 5,698,989 A | 12/1997 | Nulman | |
| 5,719,495 A | 2/1998 | Moslehi | |
| 5,719,796 A | 2/1998 | Chen | |
| 5,735,055 A | 4/1998 | Hochbein et al. | |
| 5,740,429 A | 4/1998 | Wang et al. | |
| 5,751,582 A | 5/1998 | Saxena et al. | |
| 5,754,297 A | 5/1998 | Nulman | |
| 5,761,064 A | 6/1998 | La et al. | |
| 5,761,065 A | 6/1998 | Kittler et al. | |
| 5,764,543 A | 6/1998 | Kennedy | |
| 5,777,901 A | 7/1998 | Berezin et al. | |
| 5,787,021 A | 7/1998 | Samaha | |
| 5,787,269 A | 7/1998 | Hyodo | |
| 5,808,303 A | 9/1998 | Schlagheck et al. | |
| 5,812,407 A | 9/1998 | Sato et al. | |
| 5,823,854 A | 10/1998 | Chen | |
| 5,824,599 A | 10/1998 | Schacham-Diamand et al. | |
| 5,825,356 A | 10/1998 | Habib et al. | |
| 5,825,913 A | 10/1998 | Rostami et al. | |
| 5,828,778 A | 10/1998 | Hagi et al. | |
| 5,831,851 A | 11/1998 | Eastburn et al. | |
| 5,832,224 A | 11/1998 | Fehskens et al. | |
| 5,838,595 A | 11/1998 | Sullivan et al. | |
| 5,838,951 A | 11/1998 | Song | |
| 5,841,676 A * | 11/1998 | Ali et al. | 702/84 |
| 5,844,554 A | 12/1998 | Geller et al. | |
| 5,857,258 A | 1/1999 | Penzes et al. | |
| 5,859,777 A | 1/1999 | Yokoyama et al. | |
| 5,859,964 A | 1/1999 | Wang et al. | |
| 5,859,975 A | 1/1999 | Brewer et al. | |
| 5,862,054 A | 1/1999 | Li | |
| 5,863,807 A | 1/1999 | Jang et al. | |
| 5,867,389 A | 2/1999 | Hamada et al. | |
| 5,870,306 A | 2/1999 | Harada | |
| 5,871,805 A | 2/1999 | Lemelson | |
| 5,883,437 A | 3/1999 | Maruyama et al. | |
| 5,889,991 A | 3/1999 | Consolatti et al. | |
| 5,901,313 A | 5/1999 | Wolfe et al. | |
| 5,903,455 A | 5/1999 | Sharpe, Jr. et al. | |
| 5,910,011 A | 6/1999 | Cruse | |
| 5,910,846 A | 6/1999 | Sandhu | |
| 5,912,678 A | 6/1999 | Saxena et al. | |
| 5,916,016 A | 6/1999 | Bothra | |
| 5,923,553 A | 7/1999 | Yi | |
| 5,926,690 A | 7/1999 | Toprac et al. | |
| 5,930,138 A | 7/1999 | Lin et al. | |
| 5,940,300 A | 8/1999 | Ozaki | |
| 5,943,237 A | 8/1999 | Van Boxem | |
| 5,943,550 A | 8/1999 | Fulford, Jr. et al. | |
| 5,960,185 A | 9/1999 | Nguyen | |
| 5,960,214 A | 9/1999 | Sharpe, Jr. et al. | |
| 5,961,369 A | 10/1999 | Bartels et al. | |
| 5,963,881 A | 10/1999 | Kahn et al. | |
| 5,975,994 A | 11/1999 | Sandhu et al. | |
| 5,978,751 A | 11/1999 | Pence et al. | |
| 5,982,920 A | 11/1999 | Tobin, Jr. et al. | |
| 6,002,989 A | 12/1999 | Shiba et al. | |
| 6,012,048 A | 1/2000 | Gustin et al. | |
| 6,017,771 A | 1/2000 | Yang et al. | |
| 6,036,349 A | 3/2000 | Gombar | |
| 6,037,664 A | 3/2000 | Zhao et al. | |
| 6,041,263 A | 3/2000 | Boston et al. | |
| 6,041,270 A | 3/2000 | Steffan et al. | |
| 6,054,379 A | 4/2000 | Yau et al. | |
| 6,059,636 A | 5/2000 | Inaba et al. | |
| 6,064,759 A | 5/2000 | Buckley et al. | |
| 6,072,313 A | 6/2000 | Li et al. | |
| 6,074,443 A | 6/2000 | Venkatesh et al. | |
| 6,077,412 A | 6/2000 | Ting et al. | |
| 6,078,845 A | 6/2000 | Friedman | |
| 6,094,688 A | 7/2000 | Mellen-Garnett et al. | |
| 6,096,649 A | 8/2000 | Jang | |

| | | | | | | | |
|---|---|---|---|---|---|---|---|
| 6,097,887 | A | 8/2000 | Hardikar et al. | 6,314,379 | B1 | 11/2001 | Hu et al. |
| 6,100,195 | A | 8/2000 | Chan et al. | 6,317,643 | B1 | 11/2001 | Dmochowski |
| 6,108,092 | A | 8/2000 | Sandhu | 6,320,655 | B1 | 11/2001 | Matsushita et al. |
| 6,111,634 | A | 8/2000 | Pecen et al. | 6,324,481 | B1 | 11/2001 | Atchison et al. |
| 6,112,130 | A | 8/2000 | Fukuda et al. | 6,334,807 | B1 | 1/2002 | Lebel et al. |
| 6,113,462 | A | 9/2000 | Yang | 6,336,841 | B1 | 1/2002 | Chang |
| 6,114,238 | A | 9/2000 | Liao | 6,339,727 | B1 | 1/2002 | Ladd |
| 6,127,263 | A | 10/2000 | Parikh | 6,340,602 | B1 | 1/2002 | Johnson et al. |
| 6,128,016 | A | 10/2000 | Coelho et al. | 6,345,288 | B1 | 2/2002 | Reed et al. |
| 6,136,163 | A | 10/2000 | Cheung et al. | 6,345,315 | B1 | 2/2002 | Mishra |
| 6,141,660 | A | 10/2000 | Bach et al. | 6,346,426 | B1 | 2/2002 | Toprac et al. |
| 6,143,646 | A | 11/2000 | Wetzel | 6,355,559 | B1 | 3/2002 | Havemann et al. |
| 6,148,099 | A | 11/2000 | Lee et al. | 6,360,133 | B1 | 3/2002 | Campbell et al. |
| 6,148,239 | A | 11/2000 | Funk et al. | 6,360,184 | B1 | 3/2002 | Jacquez |
| 6,148,246 | A | 11/2000 | Kawazome | 6,363,294 | B1 | 3/2002 | Coronel et al. |
| 6,150,270 | A | 11/2000 | Matsuda et al. | 6,366,934 | B1 | 4/2002 | Cheng et al. |
| 6,157,864 | A | 12/2000 | Schwenke et al. | 6,368,879 | B1 | 4/2002 | Toprac |
| 6,159,075 | A | 12/2000 | Zhang | 6,368,883 | B1 | 4/2002 | Bode et al. |
| 6,159,644 | A | 12/2000 | Satoh et al. | 6,368,884 | B1 | 4/2002 | Goodwin et al. |
| 6,161,054 | A | 12/2000 | Rosenthal et al. | 6,379,980 | B1 | 4/2002 | Toprac |
| 6,169,931 | B1 | 1/2001 | Runnels | 6,381,564 | B1 | 4/2002 | David et al. |
| 6,172,756 | B1 | 1/2001 | Chalmers et al. | 6,388,253 | B1 | 5/2002 | Su |
| 6,173,240 | B1 | 1/2001 | Sepulveda et al. | 6,389,331 | B1 * | 5/2002 | Jensen et al. ............... 700/275 |
| 6,175,777 | B1 | 1/2001 | Kim | 6,389,491 | B1 | 5/2002 | Jacobson et al. |
| 6,178,390 | B1 | 1/2001 | Jun | 6,391,780 | B1 | 5/2002 | Shih et al. |
| 6,181,013 | B1 | 1/2001 | Liu et al. | 6,395,152 | B1 | 5/2002 | Wang |
| 6,183,345 | B1 | 2/2001 | Kamono et al. | 6,397,114 | B1 | 5/2002 | Eryurek et al. |
| 6,185,324 | B1 | 2/2001 | Ishihara et al. | 6,400,162 | B1 | 6/2002 | Mallory et al. |
| 6,191,864 | B1 | 2/2001 | Sandhu | 6,405,096 | B1 | 6/2002 | Toprac et al. |
| 6,192,291 | B1 | 2/2001 | Kwon | 6,405,144 | B1 | 6/2002 | Toprac et al. |
| 6,197,604 | B1 | 3/2001 | Miller et al. | 6,417,014 | B1 | 7/2002 | Lam et al. |
| 6,204,165 | B1 | 3/2001 | Ghoshal | 6,427,093 | B1 | 7/2002 | Toprac |
| 6,210,983 | B1 | 4/2001 | Atchison et al. | 6,432,728 | B1 | 8/2002 | Tai et al. |
| 6,211,094 | B1 | 4/2001 | Jun et al. | 6,435,952 | B1 | 8/2002 | Boyd et al. |
| 6,212,961 | B1 | 4/2001 | Dvir | 6,438,438 | B1 | 8/2002 | Takagi et al. |
| 6,214,734 | B1 | 4/2001 | Bothra et al. | 6,440,295 | B1 | 8/2002 | Wang |
| 6,217,412 | B1 | 4/2001 | Campbell et al. | 6,442,496 | B1 | 8/2002 | Pasadyn et al. |
| 6,219,711 | B1 | 4/2001 | Chari | 6,449,524 | B1 | 9/2002 | Miller et al. |
| 6,222,936 | B1 | 4/2001 | Phan et al. | 6,455,415 | B1 | 9/2002 | Lopatin et al. |
| 6,226,563 | B1 | 5/2001 | Lim | 6,455,937 | B1 | 9/2002 | Cunningham |
| 6,226,792 | B1 | 5/2001 | Goiffon et al. | 6,465,263 | B1 | 10/2002 | Coss, Jr. et al. |
| 6,228,280 | B1 | 5/2001 | Li et al. | 6,470,230 | B1 | 10/2002 | Toprac et al. |
| 6,230,069 | B1 | 5/2001 | Campbell et al. | 6,479,902 | B1 | 11/2002 | Lopatin et al. |
| 6,236,903 | B1 | 5/2001 | Kim et al. | 6,479,990 | B2 | 11/2002 | Mednikov et al. |
| 6,237,050 | B1 | 5/2001 | Kim et al. | 6,482,660 | B2 | 11/2002 | Conchieri et al. |
| 6,240,330 | B1 | 5/2001 | Kurtzberg et al. | 6,484,064 | B1 | 11/2002 | Campbell |
| 6,240,331 | B1 | 5/2001 | Yun | 6,486,492 | B1 | 11/2002 | Su |
| 6,245,581 | B1 | 6/2001 | Bonser et al. | 6,492,281 | B1 | 12/2002 | Song et al. |
| 6,246,972 | B1 | 6/2001 | Klimasauskas | 6,495,452 | B1 | 12/2002 | Shih |
| 6,248,602 | B1 | 6/2001 | Bode et al. | 6,503,839 | B2 | 1/2003 | Gonzales et al. |
| 6,249,712 | B1 | 6/2001 | Boiquaye | 6,515,368 | B1 | 2/2003 | Lopatin et al. |
| 6,252,412 | B1 | 6/2001 | Talbot et al. | 6,517,413 | B1 | 2/2003 | Hu et al. |
| 6,253,366 | B1 | 6/2001 | Mutschler, III | 6,517,414 | B1 | 2/2003 | Tobin et al. |
| 6,259,160 | B1 | 7/2001 | Lopatin et al. | 6,528,409 | B1 | 3/2003 | Lopatin et al. |
| 6,259,959 | B1 * | 7/2001 | Martin ........................ 700/99 | 6,529,789 | B1 | 3/2003 | Campbell et al. |
| 6,263,255 | B1 | 7/2001 | Tan et al. | 6,532,555 | B1 | 3/2003 | Miller et al. |
| 6,268,270 | B1 | 7/2001 | Scheid et al. | 6,535,783 | B1 | 3/2003 | Miller et al. |
| 6,271,670 | B1 | 8/2001 | Caffey | 6,537,912 | B1 | 3/2003 | Agarwal |
| 6,276,989 | B1 | 8/2001 | Campbell et al. | 6,540,591 | B1 | 4/2003 | Pasadyn et al. |
| 6,277,014 | B1 | 8/2001 | Chen et al. | 6,541,401 | B1 | 4/2003 | Herner et al. |
| 6,278,899 | B1 | 8/2001 | Piche et al. | 6,546,508 | B1 | 4/2003 | Sonderman et al. |
| 6,280,289 | B1 | 8/2001 | Wiswesser et al. | 6,556,881 | B1 | 4/2003 | Miller |
| 6,281,127 | B1 | 8/2001 | Shue | 6,560,504 | B1 | 5/2003 | Goodwin et al. |
| 6,284,622 | B1 | 9/2001 | Campbell et al. | 6,563,308 | B2 | 5/2003 | Nagano et al. |
| 6,287,879 | B1 | 9/2001 | Gonzales et al. | 6,567,717 | B2 | 5/2003 | Krivokapic et al. |
| 6,290,572 | B1 | 9/2001 | Hofmann | 6,580,958 | B1 | 6/2003 | Takano |
| 6,291,367 | B1 | 9/2001 | Kelkar | 6,587,744 | B1 | 7/2003 | Stoddard et al. |
| 6,292,708 | B1 | 9/2001 | Allen et al. | 6,590,179 | B2 | 7/2003 | Tanaka et al. |
| 6,298,274 | B1 | 10/2001 | Inoue | 6,604,012 | B1 | 8/2003 | Cho et al. |
| 6,298,470 | B1 | 10/2001 | Breiner et al. | 6,605,549 | B2 | 8/2003 | Leu et al. |
| 6,303,395 | B1 | 10/2001 | Nulman | 6,607,976 | B2 | 8/2003 | Chen et al. |
| 6,304,999 | B1 | 10/2001 | Toprac et al. | 6,609,946 | B1 | 8/2003 | Tran |
| 6,307,628 | B1 | 10/2001 | Lu et al. | 6,616,513 | B1 | 9/2003 | Osterheld |

| | | | | | |
|---|---|---|---|---|---|
| 6,618,692 B2 | 9/2003 | Takahashi et al. | JP | 61-171147 | 8/1986 |
| 6,624,075 B1 | 9/2003 | Lopatin et al. | JP | 01-283934 | 11/1989 |
| 6,625,497 B2 | 9/2003 | Fairbairn et al. | JP | 3-202710 | 9/1991 |
| 6,630,741 B1 | 10/2003 | Lopatin et al. | JP | 05-151231 | 6/1993 |
| 6,640,151 B1 | 10/2003 | Somekh et al. | JP | 05-216896 | 8/1993 |
| 6,652,355 B2 | 11/2003 | Wiswesser et al. | JP | 05-266029 | 10/1993 |
| 6,660,633 B1 | 12/2003 | Lopatin et al. | JP | 06-110894 | 4/1994 |
| 6,678,570 B1 | 1/2004 | Pasadyn et al. | JP | 06-176994 | 6/1994 |
| 6,708,074 B1 | 3/2004 | Chi et al. | JP | 06-184434 | 7/1994 |
| 6,708,075 B2 | 3/2004 | Sonderman et al. | JP | 06-252236 | 9/1994 |
| 6,725,402 B1 | 4/2004 | Coss, Jr. et al. | JP | 06-260380 | 9/1994 |
| 6,728,587 B2 | 4/2004 | Goldman et al. | JP | 8-23166 | 1/1996 |
| 6,735,492 B2 | 5/2004 | Conrad et al. | JP | 08-50161 | 2/1996 |
| 6,751,518 B1 | 6/2004 | Sonderman et al. | JP | 08-149583 | 6/1996 |
| 6,774,998 B1 | 8/2004 | Wright et al. | JP | 08-304023 | 11/1996 |
| 2001/0001755 A1 | 5/2001 | Sandhu et al. | JP | 09-34535 | 2/1997 |
| 2001/0003084 A1 | 6/2001 | Finarov | JP | 9-246547 | 9/1997 |
| 2001/0006873 A1 | 7/2001 | Moore | JP | 10-34522 | 2/1998 |
| 2001/0030366 A1 | 10/2001 | Nakano et al. | JP | 10-173029 | 6/1998 |
| 2001/0039462 A1 | 11/2001 | Mendez et al. | JP | 11-67853 | 3/1999 |
| 2001/0040997 A1 | 11/2001 | Tsap et al. | JP | 11-126816 | 5/1999 |
| 2001/0042690 A1 | 11/2001 | Talieh | JP | 11-135601 | 5/1999 |
| 2001/0044667 A1 | 11/2001 | Nakano et al. | JP | 2000-183001 | 6/2000 |
| 2002/0032499 A1 | 3/2002 | Wilson et al. | JP | 2001-76982 | 3/2001 |
| 2002/0058460 A1 | 5/2002 | Lee et al. | JP | 2001-284299 | 10/2001 |
| 2002/0070126 A1 | 6/2002 | Sato et al. | JP | 2001-305108 | 10/2001 |
| 2002/0077031 A1 | 6/2002 | Johannson et al. | JP | 2002-9030 | 1/2002 |
| 2002/0081951 A1 | 6/2002 | Boyd et al. | JP | 2002-343754 | 11/2002 |
| 2002/0089676 A1 | 7/2002 | Pecen et al. | TW | 434103 | 5/2001 |
| 2002/0102853 A1 | 8/2002 | Li et al. | TW | 436383 B | 5/2001 |
| 2002/0107599 A1 | 8/2002 | Patel et al. | TW | 455938 B | 9/2001 |
| 2002/0107604 A1 | 8/2002 | Riley et al. | TW | 455976 | 9/2001 |
| 2002/0113039 A1 | 8/2002 | Mok et al. | WO | WO 95/34866 | 12/1995 |
| 2002/0127950 A1 | 9/2002 | Hirose et al. | WO | WO 98/05066 | 2/1998 |
| 2002/0128805 A1 | 9/2002 | Goldman et al. | WO | WO 98/45090 | 10/1998 |
| 2002/0149359 A1 | 10/2002 | Crouzen et al. | WO | WO 99/09371 | 2/1999 |
| 2002/0165636 A1 | 11/2002 | Hasan | WO | WO 99/25520 | 5/1999 |
| 2002/0183986 A1 | 12/2002 | Stewart et al. | WO | WO 99/59200 | 11/1999 |
| 2002/0185658 A1 | 12/2002 | Inoue et al. | WO | WO 00/00874 | 1/2000 |
| 2002/0193899 A1 | 12/2002 | Shanmugasundram et al. | WO | WO 00/05759 | 2/2000 |
| 2002/0193902 A1 | 12/2002 | Shanmugasundram et al. | WO | WO 00/35063 | 6/2000 |
| 2002/0197745 A1 | 12/2002 | Shanmugasundram et al. | WO | WO 00/54325 | 9/2000 |
| 2002/0197934 A1 | 12/2002 | Paik | WO | WO 00/79355 A1 | 12/2000 |
| 2002/0199082 A1 | 12/2002 | Shanmugasundram et al. | WO | WO 01/11679 A1 | 2/2001 |
| 2003/0017256 A1 | 1/2003 | Shimane | WO | WO 01/15865 A1 | 3/2001 |
| 2003/0020909 A1 | 1/2003 | Adams et al. | WO | WO 01/18623 | 3/2001 |
| 2003/0020928 A1 | 1/2003 | Ritzdorf et al. | WO | WO 01/25865 A1 | 4/2001 |
| 2003/0154062 A1 | 8/2003 | Daft et al. | WO | WO 01/33277 A1 | 5/2001 |
| | | | WO | WO 01/33501 A1 | 5/2001 |
| FOREIGN PATENT DOCUMENTS | | | WO | WO 01/52055 A3 | 7/2001 |
| CA | 2165847 | 8/1991 | WO | WO 01/52319 A1 | 7/2001 |
| CA | 2194855 | 8/1991 | WO | WO 01/57823 A2 | 8/2001 |
| EP | 0 397 924 A1 | 11/1990 | WO | WO 01/80306 A2 | 10/2001 |
| EP | 0 621 522 A2 | 10/1994 | WO | WO 02/17150 A1 | 2/2002 |
| EP | 0 747 795 A2 | 12/1996 | WO | WO 02/31613 A2 | 4/2002 |
| EP | 0 869 652 A2 | 10/1998 | WO | WO 02/31613 A3 | 4/2002 |
| EP | 0 877 308 A2 | 11/1998 | WO | WO 02/33737 A2 | 4/2002 |
| EP | 0 881 040 A2 | 12/1998 | WO | WO 02/074491 A1 | 9/2002 |
| EP | 0 895 145 A1 | 2/1999 | | | |
| EP | 0 910 123 A1 | 4/1999 | | | |
| EP | 0 932 194 A1 | 7/1999 | | | |
| EP | 0 932 195 A1 | 7/1999 | | | |
| EP | 1 066 925 A2 | 1/2001 | | | |
| EP | 1 067 757 A1 | 1/2001 | | | |
| EP | 1 071 128 A2 | 1/2001 | | | |
| EP | 1 083 470 A2 | 3/2001 | | | |
| EP | 1 092 505 A2 | 4/2001 | | | |
| EP | 1 072 967 A3 | 11/2001 | | | |
| EP | 1 182 526 A2 | 2/2002 | | | |
| GB | 2 347 885 A | 9/2000 | | | |
| GB | 2 365 215 A | 2/2002 | | | |
| JP | 61-66104 | 4/1986 | | | |

OTHER PUBLICATIONS

Boning, Duane S., Jerry Stefani, and Stephanie W. Butler. Feb. 1999. "Statistical Methods for Semiconductor Manufacturing." *Encyclopedia of Electrical Engineering*, J. G. Webster, Ed.

"Semiconductor Manufacturing: An Overview." <http://users.ece.gatech.edu/~gmay/overview.html>.

U.S. Appl. No. 09/363,966, filed Jul. 29, 1999, Arackaparambil et al., Computer Integrated Manufacturing Techniques.

U.S. Appl. No. 09/469,227, filed Dec. 22, 1999, Somekh et al., Multi-Tool Control System, Method and Medium.

U.S. Appl. No. 09/619,044, filed Jul. 19, 2000, Yuan, System and Method of Exporting or Importing Object Data in a Manufacturing Execution System.

U.S. Appl. No. 09/637,620, filed Aug. 11, 2000, Chi et al., Generic Interface Builder.
U.S. Appl. No. 09/656,031, filed Sep. 6, 2000, Chi et al., Dispatching Component for Associating Manufacturing Facility Service Requestors with Service Providers.
U.S. Appl. No. 09/655,542, filed Sep. 6, 2000, Yuan, System, Method and Medium for Defining Palettes to Transform an Application Program Interface for a Service.
U.S. Appl. No. 09/725,908, filed Nov. 30, 2000, Chi et al., Dynamic Subject Information Generation in Message Services of Distributed Object Systems.
U.S. Appl. No. 09/800,980, filed Mar. 8, 2001, Hawkins et al., Dynamic and Extensible Task Guide.
U.S. Appl. No. 09/811,667, filed Mar. 20, 2001, Yuan et al., Fault Tolerant and Automated Computer Software Workflow.
U.S. Appl. No. 09/927,444, filed Aug. 13, 2001, Ward et al., Dynamic Control of Wafer Processing Paths in Semiconductor Manufacturing Processes.
U.S. Appl. No. 09/928,473, filed Aug. 14, 2001, Koh, Tool Services Layer for Providing Tool Service Functions in Conjunction with Tool Functions.
U.S. Appl. No. 09/928,474, filed Aug. 14, 2001, Krishnamurthy et al., Experiment Management System, Method and Medium.
U.S. Appl. No. 09/943,383, filed Aug. 31, 2001, Shanmugasundram et al., In Situ Sensor Based Control of Semiconductor Processing Procedure.
U.S. Appl. No. 09/943,955, filed Aug. 31, 2001, Shanmugasundram et al., Feedback Control of a Chemical Mechanical Polishing Device Providing Manipulation of Removal Rate Profiles.
U.S. Appl. No. 09/998,372, filed Nov. 30, 2001, Paik, Control of Chemical Mechanical Polishing Pad Conditioner Directional Velocity to Improve Pad Life.
U.S. Appl. No. 09/998,384, filed Nov. 30, 2001, Paik, Feedforward and Feedback Control for Conditioning of Chemical Mechanical Polishing Pad.
U.S. Appl. No. 10/084,092, filed Feb. 28, 2002, Arackaparambil et al., Computer Integrated Manufacturing Techniques.
U.S. Appl. No. 10/100,184, filed Mar. 19, 2002, Al-Bayati et al., Method, System and Medium for Controlling Semiconductor Wafer Processes Using Critical Dimension Measurements.
U.S. Appl. No. 10/135,405, filed May 1, 2002, Reiss et al., Integration of Fault Detection with Run-to-Run Control.
U.S. Appl. No. 10/135,451, filed May 1, 2002, Shanmugasundram et al., Dynamic Metrology Schemes and Sampling Schemes for Advanced Process Control in Semiconductor Processing.
U.S. Appl. No. 10/172,977, filed Jun. 18, 2002, Shanmugasundram et al., Method, System and Medium for Process Control for the Matching of Tools, Chambers and/or Other Semiconductor-Related Entities.
U.S. Appl. No. 10/173,108, filed Jun. 18, 2002, Shanmugasundram et al., Integrating Tool, Module, and Fab Level Control.
U.S. Appl. No. 10/174,370, filed Jun. 18, 2002, Shanmugasundram et al., Feedback Control of Plasma-Enhanced Chemical Vapor Deposition Processes.
U.S. Appl. No. 10/174,377, filed Jun. 18, 2002, Schwarm et al., Feedback Control of Sub-Atmospheric Chemical Vapor Deposition Processes.
U.S. Appl. No. 10/377,654, filed Mar. 4, 2003, Kokotov et al., Method, System and Medium for Controlling Manufacturing Process Using Adaptive Models Based on Empirical Data.
U.S. Appl. No. 10/393,531, filed Mar. 21, 2003, Shanmugasundram et al., Copper Wiring Module Control.
U.S. Appl. No. 10/632,107, filed Aug. 1, 2003, Schwarm et al., Method, System, and Medium for Handling Misrepresentative Metrology Data Within an Advanced Process Control System.
U.S. Appl. No. 10/665,165, filed Sep. 18, 2003, Paik, Feedback Control of a Chemical Mechanical Polishing Process for Multi-Layered Films.
U.S. Appl. No. 10/712,273, filed Nov. 14, 2003, Kokotov, Method, System and Medium for Controlling Manufacture Process Having Multivariate Input Parameters.
U.S. Appl. No. 10/759,108, filed Jan. 20, 2004, Schwarm, Automated Design and Execution of Experiments with Integrated Model Creation for Semiconductor Manufacturing Tools.
Miller, G. L., D. A. H. Robinson, and J. D., Wiley. Jul. 1976. "Contactless measurement of semiconductor conductivity by radio frequency-free-carrier power absorption." *Rev. Sci. Instrum.*, vol. 47, No. 7. pp. 799-805.
Ostanin, Yu.Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45-52. Moscow, USSR.
Feb. 1984. "Method and Apparatus of in Situ Measurement and Overlay Error Analysis for Correcting Step and Repeat Lithographic Cameras." *IBM Technical Disclosure Bulletin*, pp. 4855-4859.
Feb. 1984. "Substrate Screening Process." *IBM Technical Disclosure Bulletin*, pp. 4824-4825.
Oct. 1984. "Method to Characterize the Stability of a Step and Repeat Lithographic System." *IBM Technical Disclosure Bulletin*, pp. 2857-2860.
Levine, Martin D. 1985. *Vision in Man and Machine.* New York: McGraw-Hill, Inc. pp. ix-xii, 1-58.
Herrmann, D. 1988. "Temperature Errors and Ways of Elimination for Contactless Measurement of Shaft Vibrations (Abstract)." *Technisches Messen™*, vol. 55, No. 1, pp. 27-30. West Germany.
Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216-229.
Runyan, W. R., and K. E. Bean. 1990. "Semiconducor Integrated Circuit Processing Technology." p. 48. Reading, Massachusetts: Addison-Wesley Publishing Company.
Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.
Burke, Peter A. Jun. 1991. "Semi-Empirical Modelling of SiO2 Chemical-Mechanical Polishing Planarization." *VMIC Conference, 1991 IEEE*, pp. 379-384. IEEE.
Zorich, Robert. 1991. *Handbook of Quality Integrated Circuit Manufacturing.* pp. 464-498 San Diego, California: Academic Press, Inc.
Rampalli, Prasad, Arakere Ramesh, and Nimish Shah. 1991. *CEPT—A Computer-Aided Manufacturing Application for Managing Equipment Reliability and Availability in the Semiconductor Industry.* New York, New York: IEEE.
May 1992. "Laser Ablation Endpoint Detector." *IBM Technical Disclosure Bulletin*, pp. 333-334.
Spanos, Costas J., Hai-Fang Guo, Alan Miller, and Joanne Levine-Parrill. Nov. 1992. "Real-Time Statistical Process Control Using Tool Data." *IEEE Transactions on Semiconductor Manufacturing*, v. 5, n. 4, pp. 308-318.
Feb. 1993. "Electroless Plating Scheme to Hermetically Seal Copper Features." *IBM Technical Disclosure Bulletin*, pp. 405-406.
Scarr, J. M. and J. K. Zelisse. Apr. 1993. "New Topology for Thickness Monitoring Eddy Current Sensors (Abstract)." *Proceedings of the 36th Annual Technical Conference*, Dallas, Texas.
Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.
Matsuyama, Akira and Jessi Niou. 1993. "A State-of-the-Art Automation System of an ASIC Wafer Fab in Japan." *IEEE/SEMI International Semiconductor Manufacturing Science Symposium*, pp. 42-47.
Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438-442.
Kurtzberg, Jerome M. and Menachem Levanoni. Jan. 1994. "ABC: A Better Control for Manufacturing." *IBM Journal of Research and Development*, v. 38, n. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1-11.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun.-Jul. 1994. "Application of Feedforward and Adaptive Feedback Control to Semiconductor Device Manufacturing (Abstract)." *Proceedings of 1994 American Control Conference—ACC '94*, vol. 1, pp. 892-896. Baltimore, Maryland.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference* on Munich, Germany Sep. 12-16, 1994. New York, New York: IEEE. pp. 105-112.

Schaper, C. D., M. M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33$^{rd}$ IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C. J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3-17.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control." IEEE Transactions on Semiconductor Manufacturing, vol. 8, No. 3.

Telfeyan, Roland, James Moyne, Nauman Chaudry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42$^{nd}$ National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Moyne, James R., Nauman Chaudhry, and Roland Telfeyan. 1995. "Adaptive Extensions to a Multi-Branch Run-to-Run Controller for Plasma Etching." *Journal of Vacuum Science and Technology*. Ann Arbor, Michigan: University of Michigan Display Technology Manufacturing Center.

Schmid, Hans Albrecht. 1995. "Creating the Architecture of a Manufacturing Framework by Design Patterns." Austin, Texas: OOPSLA.

Dishon, G., M. Finarov, R. Kipper, J.W. Curry, T. Schraub, D. Trojan, 4$^{th}$ Stambaugh, Y. Li and J. Ben-Jacob. Feb. 1996. "On-Line Integrated Metrology for CMP Processing." Santa Clara, California: VMIC Specialty Conferences, 1$^{st}$ International CMP Planarization Conference.

Leang, Sovarong, Shang-Yi Ma, John Thomson, and Bart John Bombay, and Costas J. Spanos. May 1996. "A Control System for Photolithographic Sequences." *IEEE Transactions on Semiconductor Manufacturing*, vol. 9, No. 2.

Smith, Taber, Duane Boning, James Moyne, Arnon Hurwitz, and John Curry. Jun. 1996. "Compensating for CMP Pad Wear Using Run by Run Feedback Control." Santa Clara, California: Proceedings of the Thirteenth International VLSI Multilevel Interconnection Conference. pp. 437-439.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on Components, Packaging, and Manufacturing Technology—Part C*, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshop*, pp. 375-381.

Yasuda, M., T. Osaka, and M. Ikeda. Dec. 1996. "Feedforward Control of a Vibration Isolation System for Disturbance Suppression (Abstract)." *Proceeding of the 35$^{th}$ IEEE Conference on Decision and Control*, vol. 2, pp. 1229-1233. Kobe, Japan.

Fan, Jr-Min, Ruey-Shan Guo, Shi-Chung Chang, and Kian-Huei Lee. 1996. "Abnormal Trend Detection of Sequence-Disordered Data Using EWMA Method." *IEEE/SEMI Advanced Semiconductor Manufacturing Conference*, pp. 169-174.

SEMI. [1986] 1996. "Standard for Definition and Measurement of Equipment Reliability, Availability, and Maintainability (RAM)." SEMI E10-96.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. "A Cost-Effective Methodology for a Run-by-Run EWMA Controller." *6$^{th}$ International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997. "Pre-Production Results Demonstrating Multiple-System Models for Yield Analysis (Abstract)." *IEEE Transactions on Semiconductor Manufacturing*, vol. 10, No. 4, pp. 469-481.

Durham, Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." *2$^{nd}$ International Workshop on Statistical Metrology*, pp. 90-93.

Van Zant, Peter. 1997. *Microchip Fabrication: A Practical Guide to Semiconductor Processing*. Third Edition, pp. 472-478. New York, New York: McGraw-Hill.

Campbell, W. Jarrett, and Anthony J. Toprac. Feb. 11-12, 1998. "Run-to-Run Control in Microelectronics Manufacturing." Advanced Micro Devises, TWMCC.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." *Automatica*, vol. 36, pp. 1567-1603, 2000.

Moyne, James, and John Curry. Jun. 1998. "A Fully Automated Chemical-Mechanical Planarization Process." Santa Clara, California: VLSI Multilevel Interconnection (V-MIC) Conference.

Jul. 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217-224.

SEMI. Jul. 1998. *New Standard: Provisional Specification for CIM Framework Domain Architecture*. Mountain View, California: SEMI Standards. SEMI Draft Doc. 2817.

Consilium. Aug. 1998. *Quality Management Component: QMC™ and QMC-Link™ Overview*. Mountain View, California: Consilium, Inc.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Consilium. 1998. *FAB300™*. Mountain View, California: Consilium, Inc.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76-78.

Khan, Kareemullah, Victor Solakhain, Anthony Ricci, Tier Gu, and James Moyne. 1998. "Run-to-Run Control of ITO Deposition Process." Ann Arbor, Michigan.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1-10.

Consilium. Jan. 1999. "FAB300™: Consilium's Next Generation MES Solution of Software and Services which Control and Automate Real-Time FAB Operations." www.consilium.com/products/fab300_page.htm#FAB300 Introduction.

McIntosh, John. Mar. 1999. "Using CD-SEM Metrology in the Manufacture of Semiconductors (Abstract)." *JOM*, vol. 51, No. 3, pp. 38-39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164-166.

Klein, Bruce. Jun. 1999. "Application Development: XML Makes Object Models More Useful." Informationweek. pp. 1A-6A.

Baliga, John. Jul. 1999. "Advanced Process Control: Soon to be a Must." Cahners Semiconductor International www.semiconductor.net/semiconductor/issues/issues/1999/jul99/docs/feature1.asp.

Consilium. Jul. 1999. "Increasing Overall Equipment Effectiveness (OEE) in Fab Manufacturing by Implementing Consilium's Next-Generation Manufacturing Execution System—MES II." Semiconductor Fabtech Edition 10.

Meckl, P. H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725-729. Kohala Coast, HI.

Consilium Corporate Brochure. Oct. 1999. www.consilium.com.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." *24th IEEE/CPMT Electronics Manufacturing Technology Symposium*, pp. 258-263.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Williams, Randy, Dadi Gudmundsson, Kevin Monahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium* on Santa Clara, CA. Piscataway, NJ. pp. 43-46.

Consilium. Nov. 1999. *FAB300™ Update*.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." *IEEE Transactions on Semiconductor Manufacturing*, vol. 12, No. 4.

1999. "Contactless Bulk Resistivity/Sheet Resistance Measurement and Mapping Systems." www.Lehighton.com/fabtech/index.html.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the 38th IEEE Conference on Decision and Control*, Phoenix, Arizona, vol. 4, pp. 4185-4191.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232-237.

Chemali, Chadi El, James Moyne, Kareemullah Khan, Rock Nadeau, Paul Smith, John Colt, Jonathan Chapple-Sokol, and Tarun Parikh. Jul./Aug. 2000. "Multizone Uniformity Control of a Chemical Mechanical Polishing Process Utilizing a Pre- and Postmeasurement Strategy." J. Vac. Sci. Technol. A, vol. 18(4). pp. 1287-1296. American Vacuum Society.

Oechsner, R., T. Tschaftary, S. Sommer, L. Pfitzner, H. Ryssel, H. Gerath, C. Baier, and M. Hafner. Sep. 2000. "Feed forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, n. 11.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05 µm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

SEMI. 2000. "Provisional Specification for CIM Framework Scheduling Component." San Jose, California. SEMI E105-1000.

2000. "Microsense II Capacitance Gaging System." www.adetech.com.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Mar. 5, 2001. "KLA-Tencor Introduces First Production-worthy Copper CMP In-situ Film Thickness and End-point Control System." http://www.kla-tencor.com/j/servlet/NewsItem?newsItemID=74.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." 51st *Electronic Components and Technology Conference 2001. Proceedings*, pp. 1372-1379. Orlando, Florida.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Pilu, Maurizio. Sep. 2001. "Undoing Page Curl Distortion Using Applicable Surfaces." *IEEE International Conference on Image Processing*. Thessalonica, Greece.

Oct. 15, 2001. Search Report prepared by the Austrian Patent Office for Singapore Patent Application No. 200004286-1.

Wang, LiRen and Hefin Rowlands. 2001. "A Novel NN-Fuzzy-SPC Feedback Control System." 8th *IEEE International Conference on Emerging Technologies and Factory Automation*, pp. 417-423.

NovaScan 2020. Feb. 2002. "Superior Integrated Process Control for Emerging CMP High-End Applications."

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE Advanced Semiconductor Manufacturing Conference and Workshop*, pp. 125-130.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr.-May 2002. "Advance Process Control Solutions for Semiconductor Manufacturing." Boston, Massachusetts: 13th *Annual IEEE/SEMI Advanced Semiconductor Manufacturing Conference. Advancing the Science and Technology of Semiconductor Manufacturing. ASMC 2002*, pp. 101-106.

Campbell, W. J., S. K. Firth, A. J. Toprac, and T. F. Edgar. May 2002. "A Comparison of Run-to-Run Control Algorithms (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Johnson, Bob. Jun. 10, 2002. "Advanced Process Control Key to Moore's Law." Gartner, Inc.

Jun. 20, 2002. Office Action for U.S. Appl. No. 09/619,044, filed Jul. 19, 2000.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285-287.

Jul. 9, 2002. International Search Report for PCT/US01/24910.

Jul. 23, 2002. Communication Pursuant to Article 96(2) EPC for European Patent Application No. 00 115 577.9.

Jul. 29, 2002. International Search Report for PCT/US01/27407.

Sep. 26, 2002. Office Action for U.S. Appl. No. 09/637,620, filed Aug. 11, 2000.

Oct. 4, 2002. International Search Report for PCT/US01/22833.

Oct. 15, 2002. International Search Report for PCT/US02/19062.

Oct. 23, 2002. International Search Report for PCT/US01/27406.

Oct. 23, 2002. Office Action for U.S. Appl. No. 09/469,227, filed Dec. 22, 1999.

Nov. 7, 2002. International Search Report for PCT/US02/19061.

Nov. 11, 2002. International Search Report for PCT/US02/19117.

Nov. 12, 2002. International Search Report for PCT/US02/19063.

Dec. 17, 2002. Office Action for U.S. Appl. No. 09/363,966, filed Jul. 29, 1999.

ACM Research, Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_releases/press_releases2001/984086002.html.

Sonderman, Thomas. 2002. "APC as a Competitive Manufacturing Technology: *AMD's Vision for 300mm*." AEC/APC.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

2002. "Microsense II—5810: Non-Contact Capacitance Gaging Module." www.adetech.com.

Feb. 10, 2003. Office Action for U.S. Appl. No. 09/619,044, filed Jul. 19, 2000.

Mar. 25, 2003. International Search Report for PCT/US02/24859.

Apr. 9, 2003. Office Action for U.S. Appl. No. 09/928,474, filed Aug. 14, 2001.

May 8, 2003. Office Action for U.S. Appl. No. 09/637,620, filed Aug. 11, 2000.

May 23, 2003. Written Opinion for PCT/US01/24910.

Jun. 18, 2003. Office Action for U.S. Appl. No. 09/655,542, filed Sep. 6, 2000.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 8, 2003. PCT International Search Report from PCT/US03/08513.

Aug. 20, 2003. Written Opinon for PCT/US01/22833.

Aug. 25, 2003. Office Action for U.S. Appl. No. 10/100,184, filed Mar. 19, 2002.

Sep. 15, 2003. Office Action for U.S. Appl. No. 09/928,474, filed Aug. 14, 2001.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

Nov. 5, 2003. Office ACtion for U.S. Appl. No. 10/172,977, filed Jun. 18, 2002.

Dec. 1, 2003. Office ACtion for U.S. Appl. No. 10/173,108, filed Jun. 18, 2002.

"NanoMapper wafer nanotopography measurement by ADE Phase Shift." Printed Dec. 9, 2003. http://www.phase-shift.com/nanomap.shtml.

"Wafer flatness measurement of advanced wafers." Printed Dec. 9, 2003. http://www.phase-shift.com/wafer-flatness.shtml.

"ADE Technologies, Inc.—6360." Printed Dec. 9, 2003. http://www.adetech.com/6360.shtml.

"3D optical profilometer MicroXAM by ADE Phase Shift." Printed Dec. 9, 2003. http://www.phase-shift.com/microxam.shtml.

"NanoMapper FA factory automation wafer nanotopography measurement." Printed Dec. 9, 2003. http://www.phase-shift.com/nanomapperfa.shtml.

Dec. 11, 2003. Office Action for U.S. Appl. No. 09/943,383, filed Aug. 31, 2001.

Dec. 16, 2003. International Search Report for PCT/US03/23964.

Cunningham, James A. 2003. "Using Electrochemistry to Improve Copper Interconnects." <http://www.e-insite.net/semiconductor/index.asp?layout=article&articleid=CA47465>.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12th Edition. Applied Materials, Inc., Santa Clara, CA.

Berman, Mike, Thomas Bibby, and Alan Smith. "Review of In Situ & In-line Detection of CMP Applications." *Semiconductor Fabtech*, 8th Edition, pp. 267-274.

Dishon, G., D. Eylon, M. Finarov, and A. Shulman. "Dielectric CMP Advanced Process Control Based on Integrated Monitoring." Ltd. Rehoveth, Israel: Nova Measuring Instruments.

Sun, S.C. 1998. "CVD and PVD Transition Metal Nitrides as Diffusion Barriers for Cu Metallization." *IEEE*. pp. 243-246.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE*. pp. 635-638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). *Advanced Metallization Conference 2000*. San Diego, CA.

Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). *IEEE*. pp. 207-209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*. Montreal, Quebec.

Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report*. vol. 102, No. 178, pp. 115-118.

Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13-14, pp. 149-153.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603-606.

Van der Straten, O., Y. Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." *IEEE*. pp. 188-190.

Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." *IEEE*. pp. 595-598.

Jul. 25, 2003. International Search Report for PCT/US02/24858.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928,474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2002.

IslamRaja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." *J. Vac. Sci. Technol. B*, vol. 11, No. 3, pp. 720-726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3-4, pp. 315-326.

Guo, R.S, A. Chen, C.L. Tseng, I.K. Fong, A. Yang, C.L. Lee, C.H. Wu, S. Lin, S.J. Huang, Y.C. Lee, S.G. Chang and M.Y. Lee. Jun. 16-17, 1998. "A Real-Time Equipment Monitoring and Fault Detection System." *Semiconductor Manufacturing Technology Workshop*, pp. 111-121.

Lantz, Mikkel. 1999. "Equipment and APC Integration at AMD with Workstream." *IEEE*, pp. 325-327.

Jul. 15, 2004. Office Action for U.S. Appl. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Serial No. PCT/US02/19063.

Aug. 18, 2004. International Preliminary Examination Report for PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Serial No. PCT/US02/21942.

Sep. 16, 2004. International Preliminary Examination Report for PCT Serial No. PCT/US02/24859.

Sep. 15, 2004. Office Action for U.S. Appl. No. 10/632,107, filed Aug. 1, 2003.

Sep. 29, 2004. Office Action for U.S. Appl. No. 09/363,966, filed Jul. 29, 1999.

Oct. 1, 2004. International Preliminary Examination Report for PCT Serial No. PCT/US03/23964.

Oct. 6, 2004. Office Action for U.S. Appl. No. 10/759,108, filed Jan 20, 2004.

Oct. 12, 2004. International Preliminary Examination Report for PCT Serial No. PCT/US02/19061.

Nov. 17, 2004. Written Opinion for PCT Serial No. PCT/US01/27407.

US 6,150,664, 11/2000, Su (withdrawn)

* cited by examiner

SYSTEM, METHOD, AND MEDIUM FOR MONITORING PERFORMANCE OF AN ADVANCED PROCESS CONTROL SYSTEM

FIELD OF THE INVENTION

The present invention relates generally to the monitoring of advanced process control systems and more particularly to a system, method, and medium of monitoring the performance of a process output during semiconductor manufacture in relation to specification limits and monitoring the accuracy of a model that predicts the performance of the process output.

BACKGROUND OF THE RELATED ART

Semiconductor manufacture is becoming an increasingly automated process requiring precise methods of process control to ensure a quality output. Since the process is automated, safeguards are required to protect the manufacturing system and acknowledge when the manufacturing system, or tool, is unstable and is performing poorly.

Typically, there are only several factors that are measured during the semiconductor manufacturing process, for example, thickness of a film after the film has been deposited, polished, and/or etched. Because of this, occasionally there will be situations in which the tool performance changes due to factors that are not directly measured. For example, one factor that is not directly monitored that can cause failures in a semiconductor device is an increased amount of particles on the wafer, where the increase in particles is caused by an increase in the pressure in a chamber where the manufacturing process is being performed. As the manufacturing process is designed, an experiment may be conducted to determine how many particles are introduced based on various levels of pressure. Since particles cannot be measured while the manufacturing process is executing, the designer must assume that the model is correct.

For situations in which there is no automated control, changes in the process performance as a result of errors in the model may be directly observed in the wafer properties. In the particles example, when the pressure in the chamber increases, the increase in the amount of particles on the wafer may be directly observed as a change in the thickness of the wafer. A human controller would notice the change in the wafer thickness and, in examining the process to determine the source of the thickness increase, would notice that the pressure had changed. The human controller would also perhaps notice that the change in pressure had caused the increase in the number of damaging particles on the wafer.

When advanced process control ("APC") techniques are applied, however, the APC methodology attempts to compensate for any changes in the manufacturing process and such changes may not be as easily observed. In the particles example, the thickness of the wafer is regulated, such that, when the model has predicted perfectly the required pressure in the chamber, as the pressure changes during execution of the process the thickness of the wafer does not change. However, when the model is not correctly predicting the behavior of the process, these pressure variations may cause an increase in particles to occur. However, although particles are being introduced and are damaging the wafer, the APC will not automatically detect these variations in pressure (i.e. the APC only detects an increase in the thickness of the wafer).

Thus, the use of advanced process control methods demonstrates a need for examining the behavior of the process in the context of a process that is being controlled. Two types of monitoring techniques, for example, process health monitoring and model health monitor, are often used to fulfill this need.

Process health monitoring may be used to effectively monitor, for example, an automated process that is under computer control. Process health monitoring detects deviation of controlled outputs of the process, or tool, away from some predetermined target area. Process health monitoring may, itself, be an automated procedure. Process health monitoring methods provide high-level information for, for example, each controlled output of a process. For example, process health monitoring may be applied to chemical mechanical planarization ("CMP"), chemical vapor deposition ("CVD"), etching, electrochemical plating processes, ("ECP"), physical vapor deposition ("PVD"), etc. Such monitoring is accomplished by taking measurements of the process parameters that are of concern, then, to perform statistical analysis of those measurements, and, finally, to compare the statistical analysis to desired limits. Thus, a determination is made as to whether any specified controlled output(s) has strayed too far from a predetermined target.

Model health monitoring, which may be used to monitor each run-to-run ("R2R") control model for CMP, CVD, ECP, PVD, etc., detects deviation of, for example, the R2R model from the actual behavior of the process, or tool. Model health monitoring also may be an automated procedure. In the case of model health monitoring, the statistical analyses may include such pertinent information as model predictions and necessary previous data to perform these model predictions. Health monitoring may, itself, be an automated procedure.

Prior methods of process and model health monitoring employed indices relating to such monitoring. However, prior methods of monitoring were used for continuous processes such as, for example, controller performance monitoring. Controller performance monitoring looks at a desired, best controller performance based on specific data, which are calculated using time series analysis, and takes a ratio of a current variance to the minimum variance controller performance. However, unlike with semiconductor manufacturing processes, controller performance monitoring takes into account only the continuous process, rather than monitoring distinct points in the process.

A continuous process, in general, refers to a process that is run in a mode where things are constantly coming in and constantly going out. A simple example is a tank that has fluid coming in and fluid going out. In a continuous process, the goal is to continually maintain the process in a certain state. For example, in the case of the tank, the goal would be to control the rate at which fluid is being pumped into, or out of, the tank such that the level of fluid in the tank is maintained at a constant level.

Controller performance monitoring is performed using minimum variance control theory for systems that have dynamics. In other words, the dynamic process is monitored only to determine what factors are affecting the maintenance of the continuous, on-going process. Prior methods of process and model health monitoring made use of the dynamic equations that are used to do control of such continuous processes.

In contrast, semiconductor processes are usually modeled as static processes for the purposes of run-to-run control. Rather than the manufacturing of a wafer being a continuous process, once a wafer is completed, the process is over. The process, itself, is repeated for subsequent wafers without being altered. A static, or discrete, process such as manufacturing a wafer can only be monitored in terms of how the process performed for prior, discrete manufacturing occurrences. An action in a static process (for example, a deposition time change or change in polish time), which occurred on the previous three wafers, may not have much of an effect on the processing of the subsequent wafer. Such static processes lack the dynamic equations used to model continuous process and, therefore, the model and process health monitoring techniques utilized for continuous process cannot be employed in monitoring static processes, e.g., semiconductor manufacturing.

What is desired is a method and system that allows a controller to monitor the performance of a static manufacture process during the entire cycle of the process such as to maintain the performance of the process as the process is repeated.

SUMMARY OF THE INVENTION

The present invention addresses the lack in the prior art described above by providing techniques to monitor static processes and to quantize the results of the monitoring with one or more indices. In the case of model health monitoring, the one or more indices can be used to monitor the performance of the process controller. In the case of process health monitoring, the one or more indices can be used to monitor the performance of the process, itself. An index, for example, a number, that characterizes the performance of either the controller or the process provides an "at-a-glance" metric that provides information as to whether or not the controller or the process is performing within acceptable limits. The purpose of the one or more indices is to provide some notification to, for example, a human operator that something in the on-going manufacturing process requires attention.

In general, embodiments of the present invention contemplate that model health monitoring for a static process, such as semiconductor manufacturing, estimates a variance of a specific controlled output over time and, then, benchmarks, or compares, this variance with an expected variance. Based upon this comparison of actual variance to the expected variance, an estimate is provided of how well the process is being controlled or how well the model is able to predict the behavior of the process and thus able to control the process. The result of this estimate is then calculated as a single, model health index. In one or more embodiments of the present invention, the model health index may also be used to trigger some sort of notification function if the controller and/or the model is not operating within acceptable limits or seems in danger or doing operating outside of these acceptable limits.

In general, embodiments of the present invention contemplate that process health monitoring for a static process, such as semiconductor manufacturing, estimates not only the variance of a specific controlled output over time, but also a bias, the difference between the actual specific controlled output and a target output. The estimated bias and the estimated variance is then used to construct a probability distribution of how likely it is that the controlled output will be within some desired performance limits. Based upon this probability distribution, a single, process health index can be calculated that represents this likelihood. In other embodiments of the present invention, the process health index may also be used to trigger some sort of notification function if the process is not operating within acceptable limits or seems in danger or doing operating outside of these acceptable limits.

In monitoring static processes, such as semiconductor wafer manufacture, the model and/or process health index also gives an indication of the entire manufacturing process for a number of wafers by indicating whether an error in the manufacture of a particular wafer, for example, a wafer whose thickness is effected by a build up of particles, is due to an actual defect in the model and/or the process, for example, a change in the pressure of the manufacturing chamber, or whether the error is an isolated, non-representative fluke, such as a bad wafer. The calculation of the model and/or process health index ideally provides a filtering mechanism by which isolated errors are not reflected in the index by determining whether a particular controlled output is non-representative outlier value.

It is one feature and advantage of the present invention to monitor the performance of a process model using one or more indices.

It is another feature and advantage of the present invention to monitor the performance of a process output using one or more indices.

It is another feature and advantage of the present invention to monitor the performance of multiple process models using one or more indices.

It is another feature and advantage of the present invention to monitor the performance of multiple process outputs using one or more indices.

These and other features and advantages of the present invention are achieved in a method for monitoring performance of an advanced process control system for at least one static process output. One or more embodiments of the present invention includes a method for monitoring performance of an advance process control system for at least one process output, which includes receiving process performance data for the at least one static process output and comparing the process performance data to a predicted value for the process performance and/or a target value for the process performance. The method also includes calculating at least one index that reflects comparison of the process performance data to the predicted value and/or the target value for the process performance. The method further includes indicating the results of the calculation on the at least one index. Indicating the results includes sending an indication to a controller that the at least one index is beyond an acceptable point, halting processing of the at least one process output if the at least one index is beyond an acceptable point, and/or storing the at least one index as an indication of the processing performance of the at least one process output.

One or more embodiments of the present invention also includes a method for monitoring performance of an advanced process control system for at least one process output that includes receiving process performance data for the at least one process output and then calculating a model health index and/or a process health index. The model health index indicates an estimate of an ability of a model to predict the behavior of the at least one process output as compared to an expected output. The process health index indicates an estimated probability of violation by the at least one process output of predefined specification limits. The method also includes indicating the results of the calculation based on the at least one of the model health index and the process health index.

One or more embodiments of the present invention also includes a method for monitoring performance of an advanced process control system for at least one process output that includes calculating a variance of a prediction error for a processing performance of the at least one process output and/or a probability for violating specification limits of the processing performance of the at least one process output. The variance and probability are based on an exponentially weighted moving average.

If the variance of the prediction error is calculated, the method also includes calculating a model health index. The model health index is a ratio of an exponentially weighted moving average-based estimate of a standard deviation of the prediction error to an expected estimate of the prediction error. The exponentially weighted moving average-based estimate of the standard deviation of the prediction error is derived from the variance of the prediction error.

If the probability for violating specification limits is calculated, the method further includes calculating a process health index. The process health index is a ratio of the probability for violating the specification limits to a specified probability limit. The method also includes indicating the results of the calculation based on the model health index and/or the process health index.

One or more embodiments of the present invention also includes a method for monitoring performance of an advanced process control system for at least one process output that includes receiving process performance data for the at least one process output and calculating a current model health index or a current process health index. The current model health index indicates an estimate of an ability of a model to predict the behavior of a current one of the at least one process output as compared to an expected output. The current process health index indicates an estimated probability of violation by a current one of the at least one process output of predefined specification limits.

If the current model health index is calculated, the method also includes calculating a subsequent model health index, which indicates an estimate of an ability of a model to predict the behavior of a subsequent one of the at least one process output as compared to an expected output. If the subsequent model health index is calculated, the method further includes storing the current model health index and the subsequent model health index, such that comparing the current model health index and the subsequent model health index give an indication of a processing performance of the at least one process output.

If the current process health index is calculated, the method also includes calculating a subsequent process health index, which indicates an estimated probability of violation by a subsequent one of the at least one process output of predefined specification limits. If the subsequent process health index is calculated, the method further includes storing the current process health index and the subsequent process health index, such that comparing the current process health index and the current process health index gives an indication of the processing performance of the at least one process output.

One or more embodiments of the present invention also includes a method for monitoring performance of an advanced process control system for at least one process output that includes calculating a current variance of a prediction error for a processing performance of the at least one process output and/or a current probability for violating specification limits of the processing performance of the at least one process output. The current variance and the current probability are based on an exponentially weighted moving average.

If the current variance of the prediction error is calculated, the method also includes calculating a current model health index. The current model health index is a ratio of a current exponentially weighted moving average-based estimate of a standard deviation of the prediction error to an expected estimate of the prediction error. The current exponentially weighted moving average-based estimate of the standard deviation of the prediction error is derived from the current variance of the prediction error.

If the current model health index is calculated, the method further includes calculating a subsequent model health index, which is calculated in a substantially similar manner to the current model health index. If the subsequent model health index is calculated, the method also includes storing the current model health index and the subsequent model health index, such that comparing the current model health index and the subsequent model health index gives an indication of the processing performance of the at least one process output.

If the current probability for violating specification limits is calculated, the method further includes calculating a current process health index. The current process health index is a ratio of the probability for violating the specification limits to a probability limit.

If the current process health index is calculated, the method also includes calculating a subsequent process health index, which is calculated in a substantially similar manner to the current process health index. If the subsequent process health index is calculated, the method further includes storing the current process health index and the subsequent process health index, such that comparing the current process health index and the subsequent process health index give an indication of the processing performance of the at least one process output.

One or more embodiments of the present invention also includes a method for monitoring performance of an advanced process control system for a plurality of process outputs that includes calculating a first model health index of a process performance of a first one of the plurality of process outputs and/or a first process health index of the process performance of the first one of the plurality of process outputs. The method also includes calculating a second model health index of the process performance of a second one of the plurality of process outputs and/or a second process health index of the process performance of the second one of the plurality of process outputs.

If the first model health index and the second model health index are calculated, the method further includes calculating an aggregate model health index of the process performance of the plurality of process outputs. If the first process health index and the second process health index are calculated, the method also includes calculating an aggregate process health index of the process performance of the plurality of process outputs.

One or more embodiments of the present invention also includes a method for monitoring performance of an advanced process control system for at least one process output that includes estimating a process deviation. The process deviation indicates deviation of a process performance from a target process performance and/or a model of the process performance. The method also includes characterizing a current estimate of the process performance using a first index that represents the deviation of the process performance from the target process performance and/or a second index that represents the deviation of the model performance from a specified model performance. The method further includes performing a notification function based on the value of the first index and/or the second index.

The features and advantages of the present invention are also achieved in a system for monitoring performance of an advanced process control system for at least one process output. The system includes a first memory that stores a predicted value for process performance of the at least one process output and/or a target value for process performance of the at least one process output. The system also includes a second memory that stores process performance data of the at least one process output and a third memory that stores at least one of a model health algorithm and a process health algorithm. The model health algorithm is used to calculate a model health index of the process performance and the process health algorithm is used to calculate a process health index of the process performance. The system further includes a processor that calculates the model health index using the model health algorithm and/or the process health index using the process health algorithm. The model health index is calculated based on a comparison of the predicted value and the process performance data of the at least one process output. The process health index is calculated based on a comparison of the target value and the process performance data of the at least one process output.

One or more embodiments of the present invention also includes a system for monitoring performance of an advanced process control system for at least one process output that includes one or more tools, which measure the at least one process output. The system also includes a controller, coupled to tool(s), which provides for central control of the tool(s).

The controller implements instructions for controlling the tool(s), including: estimating a process deviation, which indicates deviation of a process performance from a target process performance and/or a model of the process performance; characterizing a current estimate of the process performance using a first index that represents the deviation of the process performance from the target process performance and/or a second index that represents the deviation of the model performance from a specified model performance; and performing a notification function based on the value of the first index and/or the second index.

The features and advantages of the present invention are also achieved in a computer-readable medium of instruction for monitoring performance of an advanced process control system for at least one static process output. The instruction includes, receiving process performance data for the at least one process output and comparing the process performance data a predicted value for the process performance and/or a target value for the process performance. The instruction also includes calculating at least one parameter that reflects comparison of the process performance data to the predicted value for the process performance and/or the target value for the process performance. The method also includes indicating the results of the calculation based on the at least one parameter.

One or more embodiments of the present invention also includes a computer-readable medium of instruction for monitoring performance of an advanced process control system for at least one static process output. The instruction includes, receiving process performance data for the at least one process output and calculating a model health index and/or a process health index. The model health index indicates an estimate of an ability of a model to predict the behavior of the at least one process output as compared to an expected output. The process health index indicates an estimated probability of violation by the at least one process output of predefined specification limits.

DETAILED DESCRIPTION OF THE INVENTION

Reference now will be made in detail to various embodiments of the present invention. Such embodiments are provided by way of explanation of the invention and are not intended to be limited thereto. In fact, those of ordinary skill in the art may appreciate upon reading the present specification and viewing the present drawings that various modifications and variations can be made.

Monitoring the process and model health of the tool allows a controller, whether a human controller or some automated controller, to evaluate the performance of the tool. For example, alarms and warnings, which can be triggered by a decrease in either the process or model health of the tool, can be configured such that the monitoring system can stop the tool, for example, if the process and/or model health goes beyond a certain limit. Alternatively, if the process and/or model health goes beyond, for example, some less severe limit, the controller may be notified by, for example, an e-mail, a page, or by a message send to a personal data assistant ("PDA").

Figure 1:
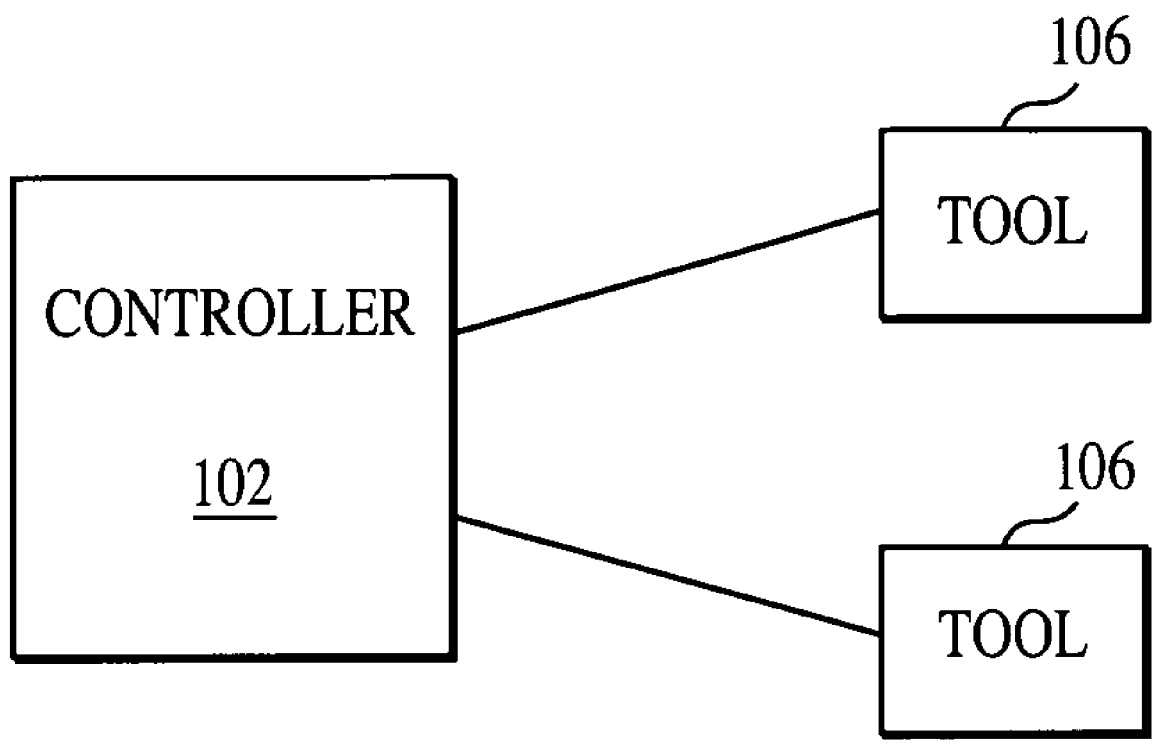
FIG. 1 is a block diagram illustrating a computerized process control system that may implement one or more embodiments of the present invention.

FIG. 1 is a block diagram illustrating an example of a computerized process control system, which may be used to implement one or more embodiments of the present invention. The system includes a control system, such as controller 102. Controller 102 may be any type of computer system capable of controlling a semiconductor manufacturing process. Controller 102 provides for central control of, and communication with, for example, one or more standard tools 106, which measure, for example, semiconductor wafers. Tools 106 are pieces of semiconductor manufacturing equipment that implement, for example, CMP, CVD, etching, and other such processes on a wafer.

I. Model Health Monitoring

Figure 2:
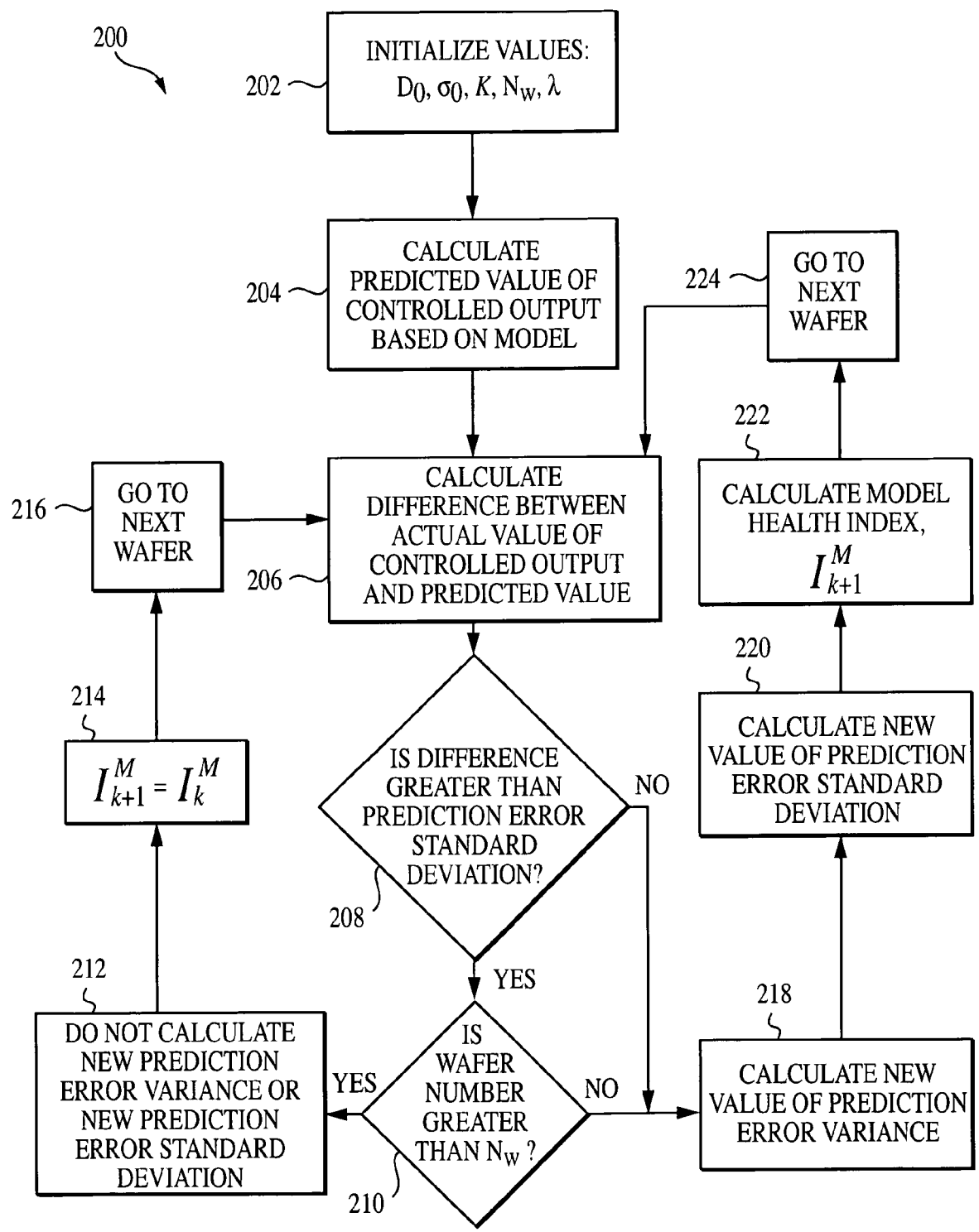
FIG. 2 is a flow chart illustrating a method of calculating a model health index, according to one or more embodiments of the present invention.

FIG. 2 is a flow chart illustrating a method of calculating the model health index in a semiconductor wafer manufacturing environment, according to one or more embodiments of the present invention. In general, the model health index, $I^M$, is a time varying parameter and, in one or more embodiments of the present invention, is calculated based on the ratio of a current estimate of an exponentially weighted moving average ("EWMA") based estimate of the standard deviation of the prediction error, $\sigma^{actual}$, versus an expected estimate, $\sigma^{ideal}$, where $\sigma^{ideal}$ is a given value. The better the model is at predicting the controlled outputs of the tool, the greater the value $I^M$ will be. If the model is performing poorly, $\sigma^{ideal}$ will be less than $\sigma^{actual}$, and $I^M$ will be less than 1. If the model is performing well, then $\sigma^{ideal}$ is greater than $\sigma^{actual}$ and the ratio will be greater than 1. The value of $I^M$ is, for example, limited between 0 and 1. Thus, $I^M$ is calculated as follows:

$$I^M = \min\left\{1, \frac{\sigma^{ideal}}{\sigma^{actual}}\right\}.$$

A methodology for obtaining $\sigma^{actual}$ is discussed below.

The length of the process history, which is involved in the calculation of the model health, is determined by a specific EWMA coefficient, $\lambda$, which is a given value (step 202). It should be noted that "given" values, as described herein, may be determined by experience or through direct measure, as generally known to those skilled in the art. A predicted value for the controlled output of the semiconductor wafer is determined based on a process model (step 204), as described below in greater detail.

The calculation of the model health index is an iterative process that is performed by considering the difference between an actual value of a controlled output of, for example, a semiconductor wafer k+1, $$y_{k+1}^{actual},$$

and a predicted value for the controlled output of the semiconductor wafer k+1, $$y_{k+1}^{predicted},$$

where "k" indicates the wafer number (step 206). If this difference is larger than an estimate of the standard deviation of the prediction error for the previous wafer k, $\sigma_k^{actual}$ (step 208), multiplied by a factor, K, indicating that the model is significantly different from the actual controlled output of the tool for that wafer, then that controlled output is ignored as a flier, or a non-representative outlier value, which is not representative of the controller output of the tool. The initial value of $\sigma_k^{actual}$, $\sigma_0^{actual}$, is given (step 202).

Since the process for determining the model health relies upon the most recently received information, more accurate values for $\sigma_k^{actual}$ are "learned" by continuously gathering information from the process. Because the initial value of the standard deviation is assumed, the first several values of $\sigma_k^{actual}$ will most probably not accurately reflect the actual standard deviation of the process, and thus, the difference between $$y_{k+1}^{actual} \text{ and } y_{k+1}^{predicted}$$

will almost always be greater than $\sigma_k^{actual}$. Therefore, screening for outliers, or flier, which involves a value, K, and the current estimate of the standard deviation of the prediction error, $\sigma_k^{actual}$, does not occur until the wafer number is greater than some specified wafer number, $N_W$ (step 210). The initial estimation of the standard deviation of the prediction error, thus, always is used for the first several wafers, up to some wafer number $N_w$, which is a given value (step 202). The previous considerations can be summarized by the following conditional equation:

$$\text{if } |y_{k+1}^{actual} - y_{k+1}^{predicted}| \leq K \cdot \sigma_k^{actual} \text{ OR } k+1 \leq N_w, \quad \text{(Equation 1)}$$

where K is a given coefficient (step 202).

If the condition holds true, an EWMA estimate of prediction error variance for the wafer k+1, $D_{k+1}$, is calculated (step 218). In general, D is an estimate of the predication error variance, or in other words, an estimate of the difference in an expected controlled output for a wafer and the actual controlled output for that wafer, that is calculated for a number of different wafers that undergo the process. $D_{k+1}$ is based on the difference between $$y_{k+1}^{actual}$$

and $$y_{k+1}^{predicted},$$

the length of the process history, and the estimate of the prediction error variance for the previous wafer k, $D_k$. In one or more embodiments of the present invention, this can be calculated as follows:

$$D_{k+1} = \lambda\left(y_{k+1}^{actual} - y_{k+1}^{predicted}\right)^2 + (1-\lambda)D_k, \quad \text{(Equation 2)}$$

where $D_0$ is given (step 202). Of course, it should be understood that other specific ways to calculate $D_{k+1}$ are also contemplated.

The estimate of the standard deviation of the prediction error for the wafer k+1, $$\sigma_{k+1}^{actual},$$

is then calculated (step 220) as follows:

$$\sigma_{k+1}^{actual} = \sqrt{D_{k+1}}. \quad \text{(Equation 3)}$$

The model health index, $I^M$, for the wafer k+1, as contemplated by one or more embodiments of the present invention, can then be calculated (step 222) as described previously:

$$I_{k+1}^M = \min\left(1, \frac{\sigma^{ideal}}{\sigma_{k+1}^{actual}}\right). \quad \text{(Equation 4)}$$

In the next iteration, wafer k+1 becomes wafer k (step 224) and the values $D_{k+1}$ and $$\sigma_{k+1}^{actual}$$

become $D_k$ and $$\sigma_{k+1}^{actual},$$

respectively.

If the condition does not hold true (from Equation 1), the controlled output for wafer k+1, $$y_{k+1}^{actual},$$

is considered a non-representative outlier value, or a flier. Therefore, the values of $D_{k+1}$ and $$\sigma_{k+1}^{actual}$$

are not calculated (step 212) but are taken as the values of $D_k$ and $\sigma_k^{actual}$, respectively. Thus, the model health index for wafer k+1, $I_{k+1}^M$, remains the same as the model health index for the previous wafer k, $I_k^M$ (step 214). Wafer k+1 then becomes wafer k (step 216). It should be understood that other specific ways to calculate $I^M$ are also contemplated by one or more embodiments of the present invention.

The complete dynamic calculation of $I_{k+1}^M$ can be summarized as follows:

if $\left| y_{k+1}^{actual} - y_{k+1}^{pred} \right| \leq K \cdot \sigma_k^{actual}$ OR $k+1 \leq N_w$ $$D_{k+1} = \lambda\left(y_{k+1}^{actual} - y_{k+1}^{predicted}\right)^2 + (1-\lambda)D_k$$

$$\sigma_{k+1}^{actual} = \sqrt{D_{k+1}}$$

-continued else $$D_{k+1} = D_k$$

$$\sigma_{k+1}^{actual} = \sqrt{D_{k+1}}.$$

Figure 3:
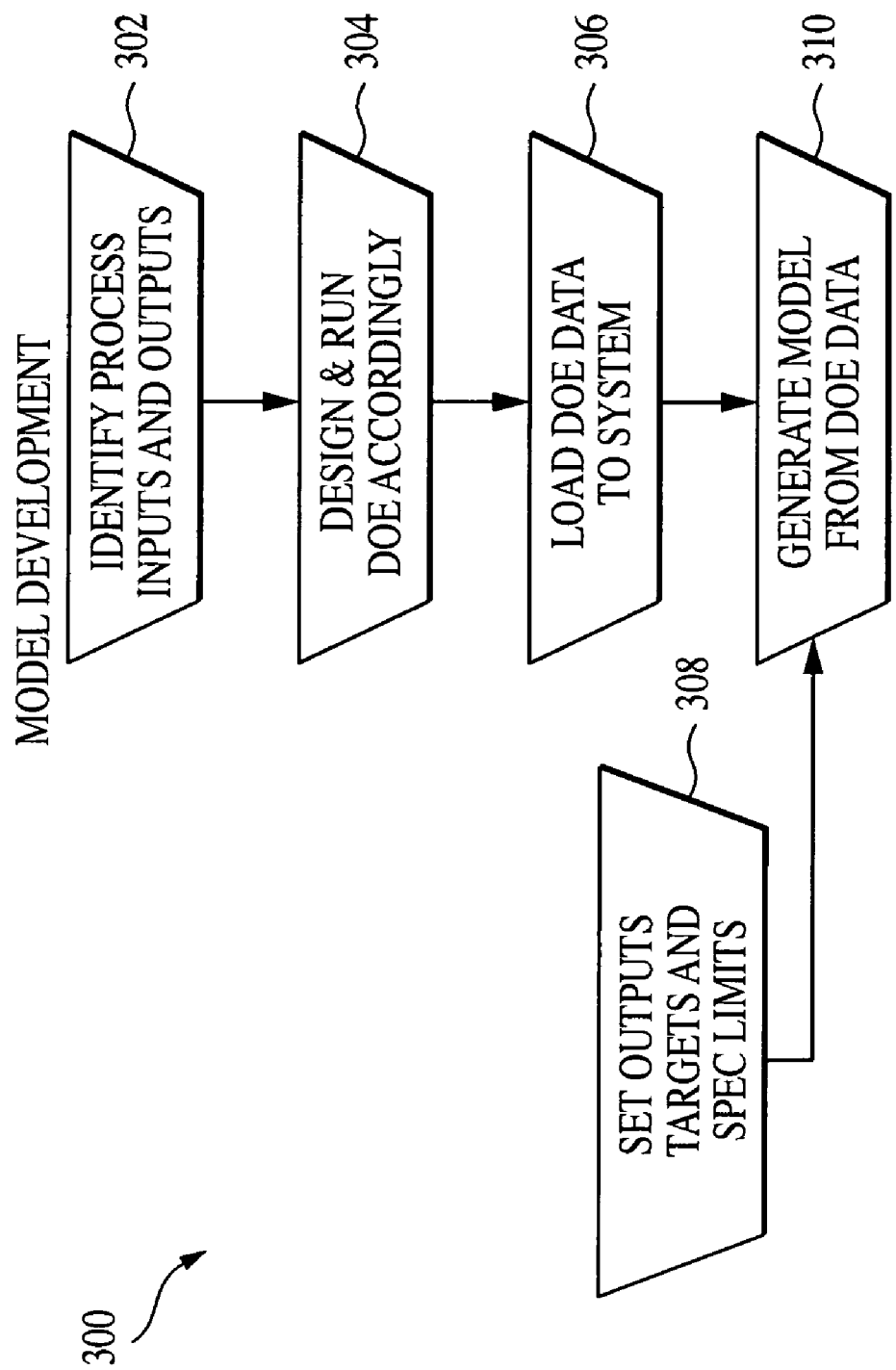
FIG. 3 is a flow diagram illustrating development of an example of initial model used in calculating the model health index.

FIG. 3 is a flow diagram illustrating development of an initial model based upon knowledge of the tool. An initial understanding of the system is acquired in step 302, which is used to design and run a design of experiments (DOE) of step 304. The DOE desirably is designed to establish the relationship between or among variables that have a strong and predictable impact on the processing output one wishes to control, e.g., film thickness or some other film property. The DOE provides data relating to process parameters and process outcome, which is then loaded to the advanced process control system in step 306. The advanced process control system may be a controller or computer that uses the data to create and update the model. The model can be represented as raw data that reflects the system, or it can be represented by equations, for example multiple input-multiple output linear, quadratic and general non-linear equations, which describe the relationship among the variables of the system. Process requirements such as output targets and process specification are determined by the user in step 308, which are combined with the DOE data to generate a working model in step 310.

Figure 4:
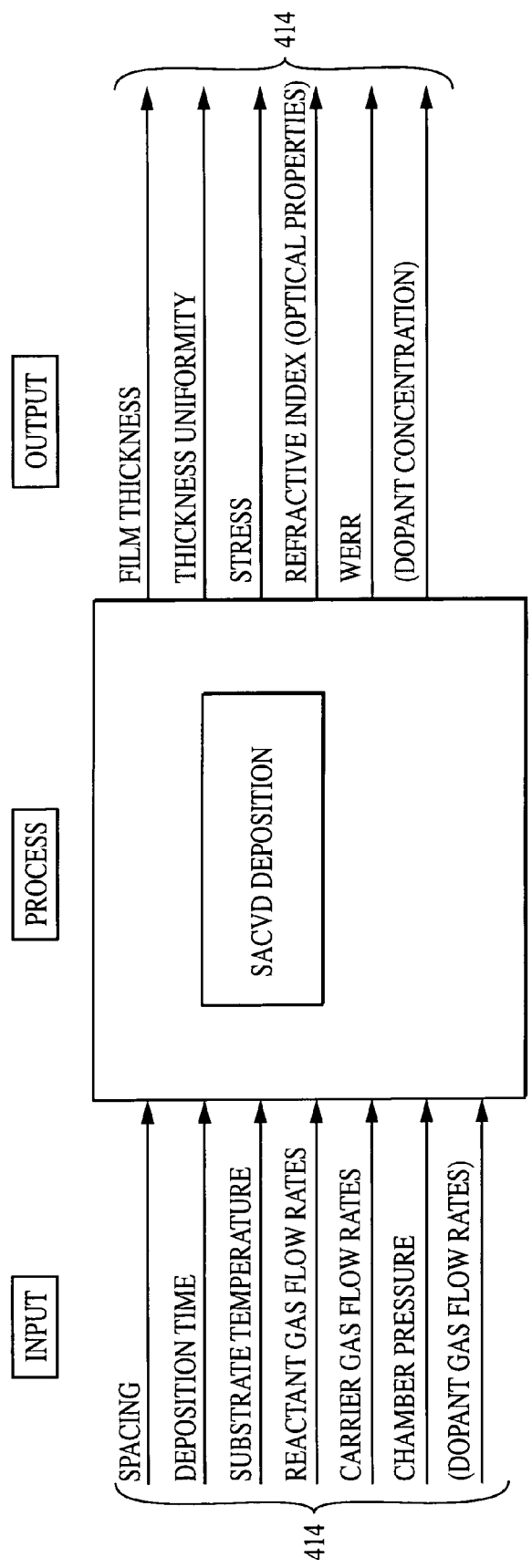
FIG. 4 is a schematic illustrating a relationship between input and output variables.

In developing the model, for example for a sub-atmospheric chemical deposition ("SACVD") process, film properties of interest 412 are identified and outcome determinative processing model variables 414 are selected for the model, as illustrated schematically in FIG. 4. The specific film properties of interest may vary depending upon the type of film deposited, and thus the film properties of interest 412 and processing model variables 414 of FIG. 4 are shown by way of example.

Regardless of the type of film substance for which a model is created, to obtain DOE data, an experiment is run which perturbs or varies the values of the processing variables of interest about a center point (or median value). One or more processing variables can be varied. The film properties of interest in the resultant film are measured for each combination of inputs. Data can be acquired empirically, by carrying out a series of experiments over a range of values of the processing variables. The data is fit to the appropriate curve (linear or non-linear) to define the model.

II. Process Health Monitoring

Figure 5:
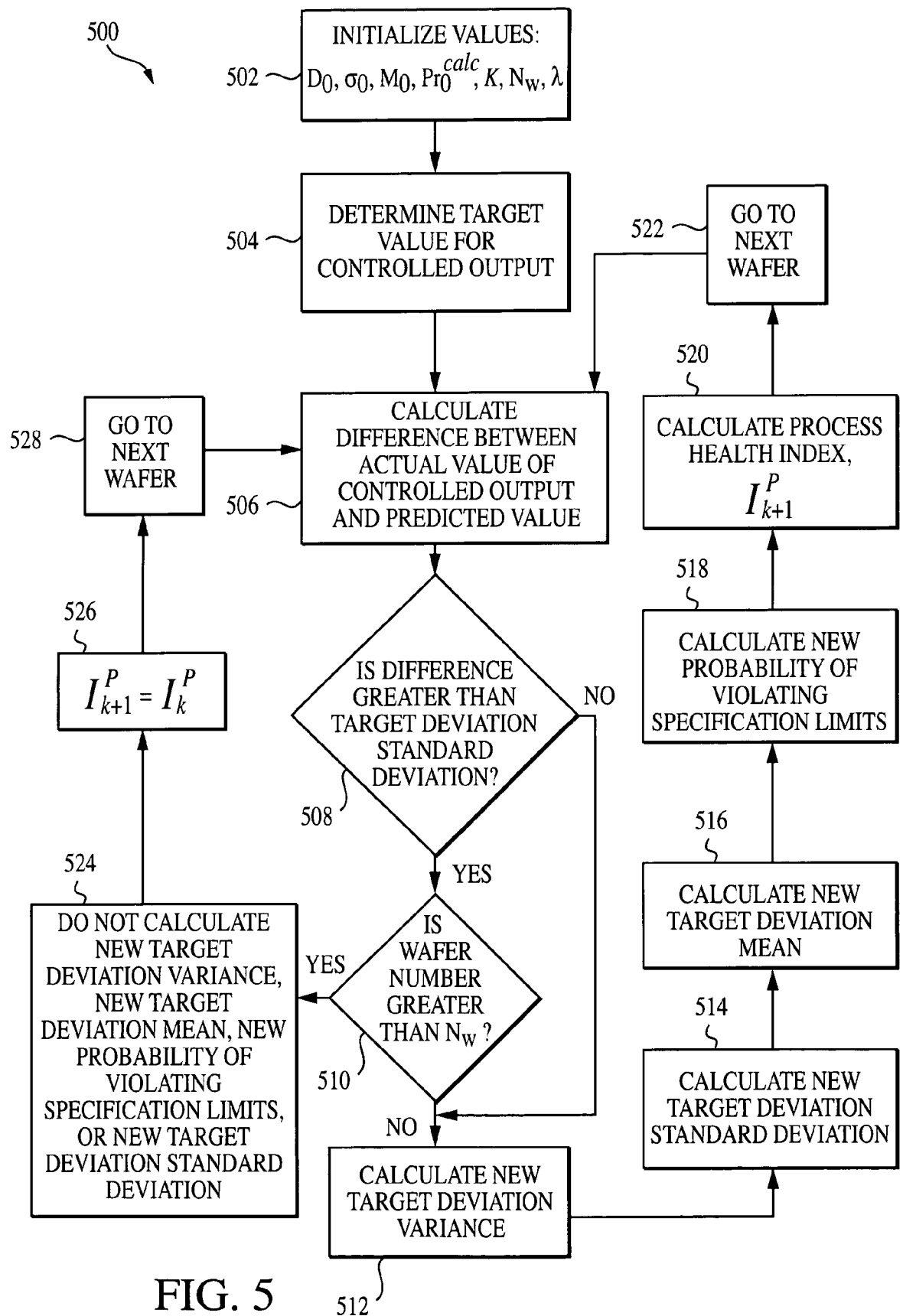
FIG. 5 is a flow chart illustrating a method of calculating a process health index, according to one or more embodiments of the present invention.

FIG. 5 is a flow chart illustrating an example method of calculating the process health index in a semiconductor wafer manufacturing environment, according to one or more embodiments of the present invention. In general, the process health index, $I_{k+1}^P$, is a time varying parameter and, in one or more embodiments of the present invention, is calculated based on the ratio of a current estimate of the probability for violating specification limits, $$Pr_{k+1}^{calc},$$

versus a probability limit, $Pr^{limit}$, where $Pr^{limit}$ is a given value, for example, 95%. If the tool is performing beyond the predetermined specification limits, indicating that the process is performing poorly, $Pr_{k+1}^{calc}$ will be greater than $Pr^{limit}$. If, however, the tool is performing within the predetermined specification limits, indicating that the process is performing within acceptable limits, $Pr_{k+1}^{calc}$ will be less than $Pr^{limit}$. The value of $I_{k+1}{}^P$ is, for example, limited between 0 and 1, with a higher value indicating acceptable performance of the process. Thus, $I_{k+1}{}^P$ is calculated as follows:

$$I_{k+1}^P = \max\left(0, 1 - \frac{Pr_{k+1}^{calc}}{Pr^{limit}}\right).$$

A methodology for obtaining $Pr_{k+1}^{calc}$ is discussed below.

The length of the process history, which is involved in the calculation of the process health, is determined by a specific EWMA coefficient, λ, which is a given value (step 502). As stated previously, it should be noted that "given" values, as described herein, may be determined by experience or through direct measure, as generally known to those skilled in the art. A set of specification limits for the controlled output of the processed semiconductor wafer is determined based on a desired performance of the tool (step 504).

Figure 6:
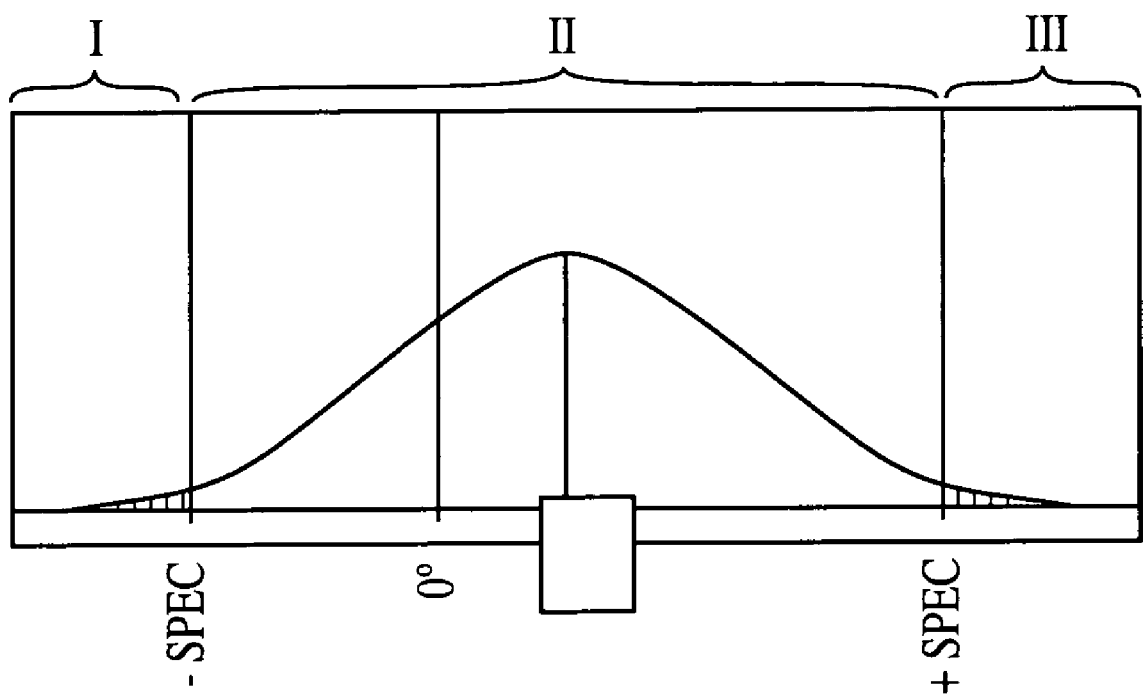
FIG. 6 is a graph illustrating a standard normal distribution of a probability for violating specification limits of a tool.

The probability that a controlled output of the tool will be within with certain specification limits can be modeled using a standard normal distribution bell curve, as illustrated in FIG. 6. Regions I and III represent a probability beyond $Pr^{limit}$, for example, a probability greater than 95% that the controlled output will be beyond the specification limits, and is thus an undesirable controlled output. Region II represents a probability that is within the specification limits. The relationship of $I^P$ for a wafer k+1 to this standard probability distribution can be illustrated mathematically as follows:

$$I_{k+1}^P = \begin{cases} Pr_{k+1} \geq Pr^{limit} : 0 \\ Pr_{k+1} < Pr^{limit} : 1 - \left(\frac{Pr_{k+1}}{Pr^{limit}}\right), \end{cases} \quad \text{(Equation 5)}$$

where $Pr_{k+1}$ is a value for $Pr^{calc}$ for a wafer k+1.

Referring back to FIG. 5, the calculation of the process health index is an iterative process that is performed by considering the difference between an actual value of a controlled output of, for example, a semiconductor wafer k+1, $y_{k+1}^{actual}$, and target value for the controlled output of the semiconductor wafer k+1, $y_{k+1}^{target}$, where "k" indicates the wafer number (step 506):

$$\Delta_{k+1} = y_{k+1}^{actual} - y_{k+1}^{targeet}. \quad \text{(Equation 6)}$$

If this difference is larger than an estimate of the standard deviation of a target deviation for the previous wafer k, $\sigma_k^{actual}$, multiplied by a factor K (step 508), indicating that the actual controlled output of the tool for that wafer is significantly different from target controlled output, then that controlled output is ignored as a flier, or a non-representative outlier value, which is not representative of the controlled output of the tool. The initial value of $\sigma_k^{actual}$, $\sigma_0^{actual}$, is given (step 502).

As described previously, more accurate values for $\sigma_k^{actual}$ are "learned" by continuously gathering information from the process. Since the initial value of the standard deviation is assumed, the first several values of $\sigma_k^{actual}$ will most probably not accurately reflect the actual standard deviation of the process, and thus, the difference between $y_{k+1}^{actual}$ and $y_{k+1}^{target}$ will always be greater than $\sigma_k^{actual}$. Therefore, screening for outliers, or fliers, which involves a value, K, and the current estimate of the standard deviation of the target deviation, $\sigma_k^{actual}$, does not occur until the wafer number, $N_W$, is greater than some specified wafer number (step 510). The initial estimation of the standard deviation, thus, always is used for the first several wafers, up to some wafer number $N_W$, which is a given value (step 502). The previous considerations can be summarized by the following conditional equation:

$$\text{if } |\Delta_{k+1}| \leq K \cdot \sigma_k^{actual} \text{ OR } k+1 \leq N_W, \quad \text{(Equation 7)}$$

where K is a given coefficient (step 502).

If the condition holds true, an EWMA estimate of target deviation variance for the wafer k+1, $D_{k+1}$, is calculated (step 512). In this case, D is an estimate of target deviation variance, or in other words, an estimate of the difference in a target controlled output for a wafer and the actual controlled output for that wafer that is calculated for a number of different wafers that undergo the process. $D_{k+1}$ is based on the difference between $y_{k+1}^{actual}$ and $y_{k+1}^{target}$, the length of the process history, and the estimate of the target deviation variance for the previous wafer k, $D_{k+1}$. In one or more embodiments of the present invention, this can be calculated as follows:

$$D_{k+1} = \lambda(\Delta_{k+1})^2 + (1-\lambda)D_k, \quad \text{(Equation 8)}$$

where $D_0$ is given (step 502). Of course, it should be understood that other specific way to calculate $D_{k+1}$ are also contemplated.

The estimate of the standard deviation of the target deviation for the wafer k+1, $\sigma_{k+1}$, is then calculated (step 514) as follows:

$$\sigma_{k+1} = \sqrt{D_{k+1}}. \quad \text{(Equation 9)}$$

Next, an EWMA estimate of the target deviation mean for wafer k+1, $M_{k+1}$, is calculated (step 516) in one or more embodiments of the present invention as follows:

$$M_{k+1} = \lambda\Delta_{k+1} + (1-\lambda)M_k, \quad \text{(Equation 10)}$$

where $M_0$ is given (step 502).

Finally, $$Pr_{k+1}^{calc},$$

for wafer k+1 is calculated (step 518). In general, $Pr^{calc}$ represents an estimate of the probability that a controlled output for a wafer will violate some predetermined, desired specification performance limits and is calculated for a number of different wafers that undergo the process. In one or more embodiments of the present invention, this is calculated as follows:

$$Pr_{k+1}^{calc} = Pr_k^{calc}\{USL < N(M_{k+1}, D_{k+1}) < LSL\}, \quad \text{(Equation 11)}$$

where $Pr_0^{calc}$ is given (step 502), such that $$Pr_{k+1}^{calc}$$

is based upon the estimated probability for violating specification limits for wafer k, $Pr_k^{calc}$, a predetermined upper specification limit ("USL"), a predetermined lower specification limit ("LSL"), and a normally distributed variable with the previously described "bell-curve" distribution (FIG. 6). The actual, mathematical calculation of $Pr_k^{calc}$ for a wafer k, which can be extrapolated for the calculation of $Pr^{k+1calc}$ as appropriate, is as follows:

$$Pr_k^{calc} = Pr\{USL < N(M_k, D_k) < LSL\} \quad \text{(Equation 12)}$$
$$= Pr\{N(M_k, D_k) < LSL\} - Pr\{N(M_k, D_k) < USL\}$$

with $$Pr\{N(M_k, D_k) < x\} = \frac{1}{2}\text{erfc}\left(x - \frac{M_k}{\sqrt{2D_k}}\right) \quad \text{(Equation 13)}$$

and $$\text{erfc}(z) = \frac{2}{\sqrt{\pi}}\int_z^\infty e^{-t^2}dt, \quad \text{(Equation 14)}$$

where "x" represents either USL or LSL, as appropriate, and "erfc" is a complementary error function. Of course, it should be understood that other specific way to calculate $Pr^{k+1calc}$ are also contemplated.

The process health index, $I_{k+1}^P$, for the wafer k+1, as contemplated by one or more embodiments of the present invention, can then be calculated (step 520) as described previously:

$$I_{k+1}^P = \begin{cases} Pr_{k+1} \geq Pr^{limit} : 0 \\ Pr_{k+1} < Pr^{limit} : 1 - \left(\frac{Pr_{k+1}^{calc}}{Pr^{limit}}\right) \end{cases}.$$

In the next iteration, wafer k+1 becomes wafer k (step 522) and the values $D_{k+1}$, $\sigma_{k+1}$, and $M_{k+1}$, and $$Pr_{k+1}^{calc}$$

become $D_k$, $\sigma_k$, $M_k$, and $Pr_k^{calc}$, respectively.

If the condition does not hold true (from Equation 7), the controlled output for wafer k+1, $$y_{k+1}^{actual},$$

is considered a non-representative outlier value, or a flier. Therefore, the values of $D_{k+1}$, $\sigma_{k+1}$, and $M_{k+1}$, and $$Pr_{k+1}^{calc}$$

are not calculated (step 524) but are taken as the values of $D_k$, $\sigma_k$, $M_k$, and $Pr_k^{calc}$, respectively. Thus, the process health index for wafer k+1, $I_{k+1}^P$, remains the same as the process health index for the previous wafer k, $I_k^P$ (step 526). Wafer k+1 then becomes wafer k (step 528). It should be understood that other specific ways to calculate $I^P$ are also contemplated by one or more embodiments of the present invention.

The complete dynamic calculation of $I_{k+1}^P$ can be summarized as follows:

$$\Delta_{k+1} = (y_{k+1}^{actual} - y_{k+1}^{target})$$

if $$|\Delta_{k+1}| \leq K\sigma_k^{actual} \text{ OR } k+1 \leq N_W$$

$$D_{k+1} = \lambda(\Delta_{k+1})^2 + (1-\lambda)D_k$$

$$\sigma_{k+1} = \sqrt{D_{k+1}}$$

$$M_{k+1} = \lambda(\Delta_{k+1}) + (-\lambda)M_k$$

-continued $$Pr_{k+1}^{calc} = Pr\{USL < N(M_{k+1}, D_{k+1}) < LSL\}.$$

else $$D_{k+1} = D_k$$

$$M_{k+1} = M_k$$

$$Pr_{k+1}^{calc} = Pr_k^{calc}$$

In general, both process and model health monitoring can be used to gain insight into the health of a process, although they provide different levels of analysis. As stated previously, the process health index provides an indication of how well the actual process is performing while the model health index provides an indication of whether or not the configuration of the process controller should be modified. Therefore, performing model health monitoring in addition to process health monitoring provides further information, which allows for increased refining and improvement of the control of the process.

III. Higher Level Health Monitoring

An advanced process control system may have multiple controlled outputs and also may have multiple process descriptors, which indicate different layers of a semiconductor product, as well as different products. For example, a particular tool may have multiple chambers, or resources, which are essentially places to process. On a single wafer, parameters that are typically controlled include, for example: average thickness, thickness uniformity, and dopant concentration. Although each controlled output or process descriptor can be monitored with a separate model and/or process health index, it may be more efficient to create a single, aggregate model health index and/or a single, aggregate process health index that characterizes either the health for a specific process descriptor for a specific chamber or processing station, the health of the entire processing system for a specific process descriptor, or the health of the entire system for all process descriptors.

The higher-level health-monitoring, or aggregate, index for model health and/or process health is calculated, according to one or more embodiments of the present invention, using a mean of the indices. One type of mean is a geometric mean, calculated as follows:

$$I^{M,P}|_{system} = \sqrt[N]{\prod_{i=1}^{N} I^{M,P}|_{y_i}}, \quad \text{(Equation 15)}$$

where N is the total number of controlled outputs being monitored in the system and $y_i$ indicates a particular controlled output. Other, alternate methods of calculating the aggregate index may be used. It should be noted that a single, aggregate index can be calculated to monitor either the process health of the multiple outputs or the model health of the multiple output but not both the process health and model health.

Figure 7:
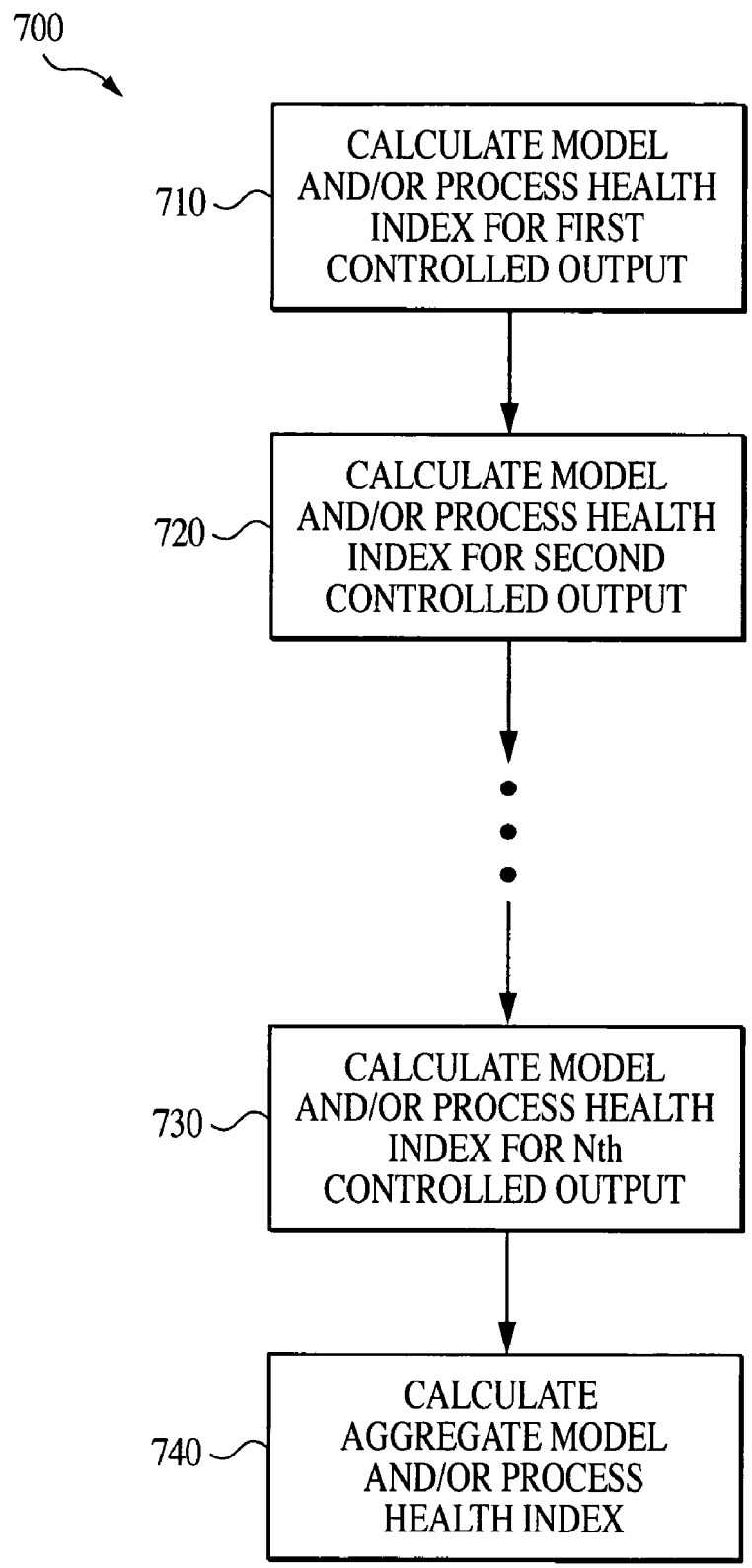
FIG. 7 is a flow chart illustrating an example of the calculation of an aggregate model and/or process health index for three controlled outputs.

FIG. 7 is a flow chart illustrating an example of the calculation of an aggregate model and/or process health index for N controlled outputs. The model and/or process health index is calculated for a first controlled output, $I^{M,P}|_y^1$ (step 710). The model and/or process health index is then calculated for a second controlled output, $I^{M,P}|_y^2$ (step 720). These calculations continue until the model and/or process health index is calculated for an nth controlled output, $I^{M,P}|_y^n$ (step 730). The aggregate model and/or process health index, $I^{M,P}|_{systems}$ is then calculated as described above (step 740).

IV. Health Tracking and Notification

Figure 8:
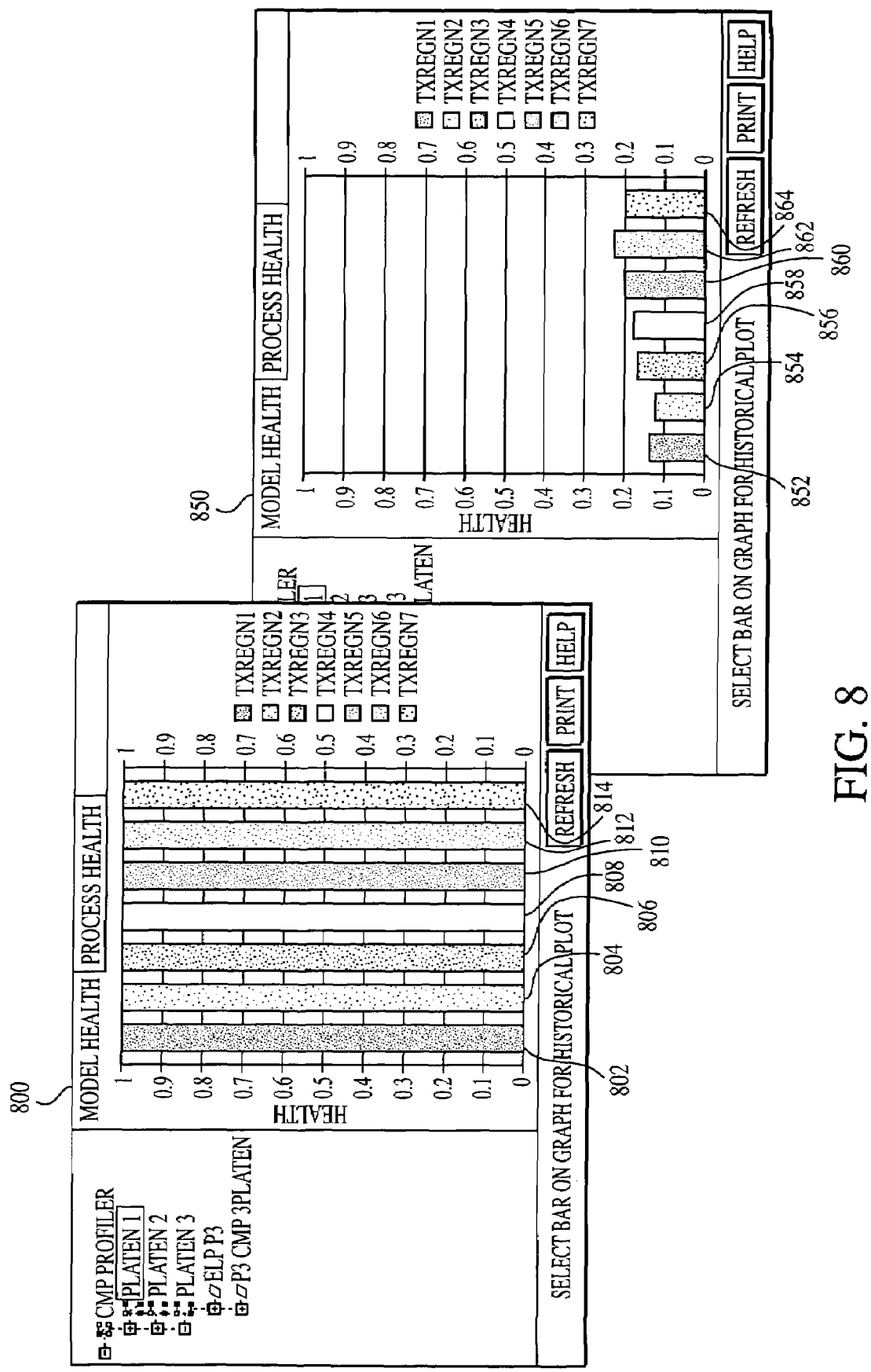
FIG. 8 illustrates an example of a visual display that can be used to track the health of a system based on a health index.

FIG. 8 illustrates an example of a visual display that can be used to track the health of a system based on a health index. In this example, display 800 illustrates a graphical display of model health indices for seven controlled outputs 802, 804, 808, 808, 810, 812, and 814. Display 800 shows that the model used to predict the actual values of the controlled outputs is performing well, as indicated by the model health index values being close to or equal to 1.

Display 850 illustrates a graphical display of model health indices for seven controlled outputs 852, 854, 857, 858, 860, 862, and 864. By contrast with display 800, in this example, display 850 shows that the models used to predict the actual values of the controlled outputs is performing poorly, as indicated by the low model health index values.

Figure 9:
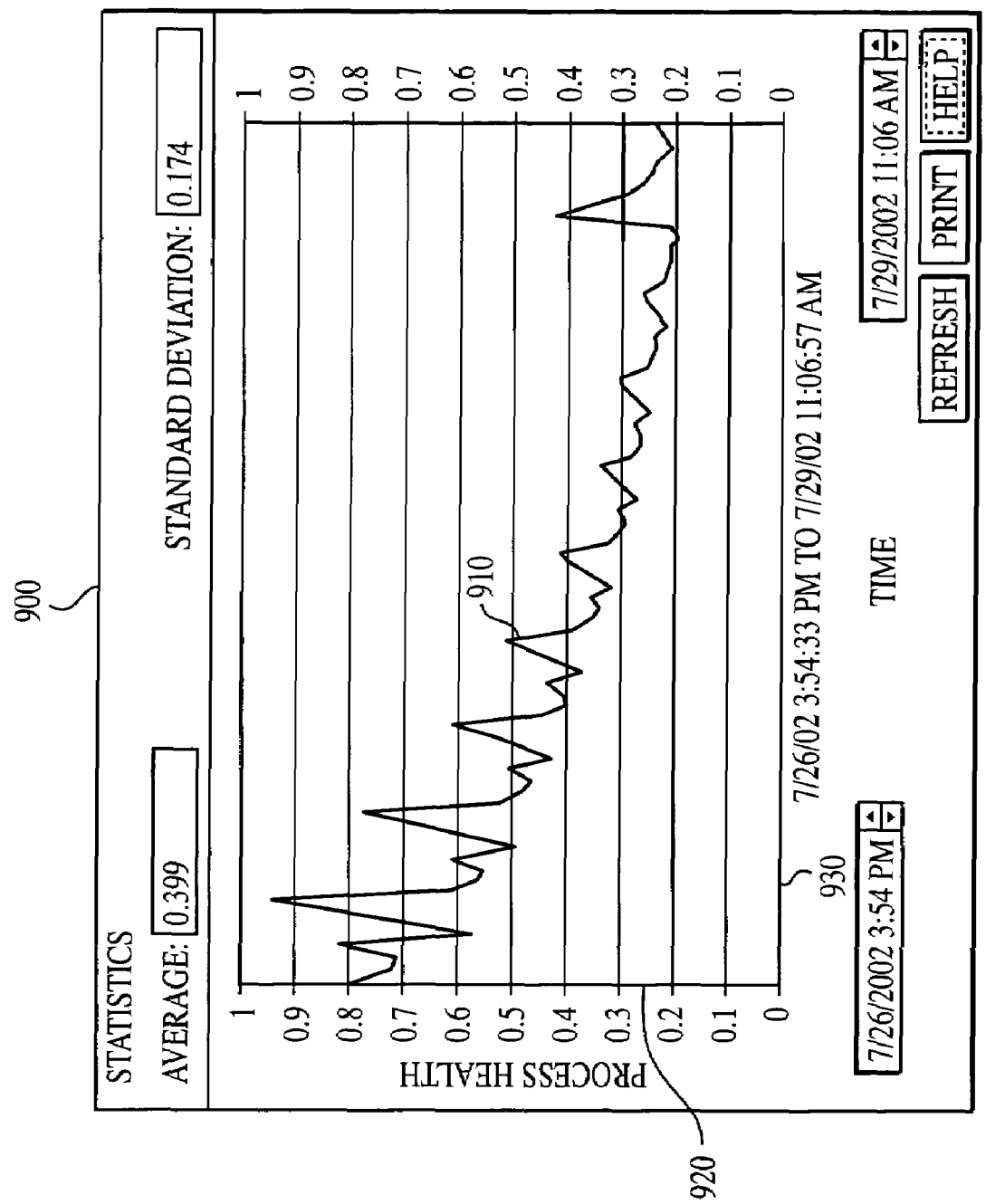
FIG. 9 illustrates an example of a visual display that can be used to track the health of a system over time based on a health index.

FIG. 9 illustrates an example of a visual display, display 900, which can be used to track the health of a system over time based on a health index. In this example, the health of a process over time is represented by line graph 910. The value of the process health index is shown on vertical axis 920 and the time progression is shown on horizontal axis 930. The decreasing value of the process health index indicates that the controlled output being tracked is degrading, continuing to veer further and further away from the target output value.

The model and/or process health index can be used to perform several notification functions of the health of the tool or system. For example, if the model and/or process health index drops below some predetermined threshold, e.g., below 0.4, a notification message may be sent to a human controller using, for example, an e-mail, a page, or a wireless PDA. Other notification methods are, of course, possible. Likewise, notification can be sent to a computerized controller, where the computerized controller may respond by raising some warning flag. If the model and/or process health index drops below some critical point, the human or computerized controller may respond by shutting down the system, and thus halting processing of the tool until the cause of the health degradation can be located and remedied.

The model and/or process health index may also be used to generally track the overall health of the system. The various iterative values of the model and/or process health index may be stored in some memory either as a single instance of health (FIG. 8), or over time (FIG. 9), and then displayed or otherwise delivered to the human or computerized controller.

V. Computer Implementation

Figure 10:
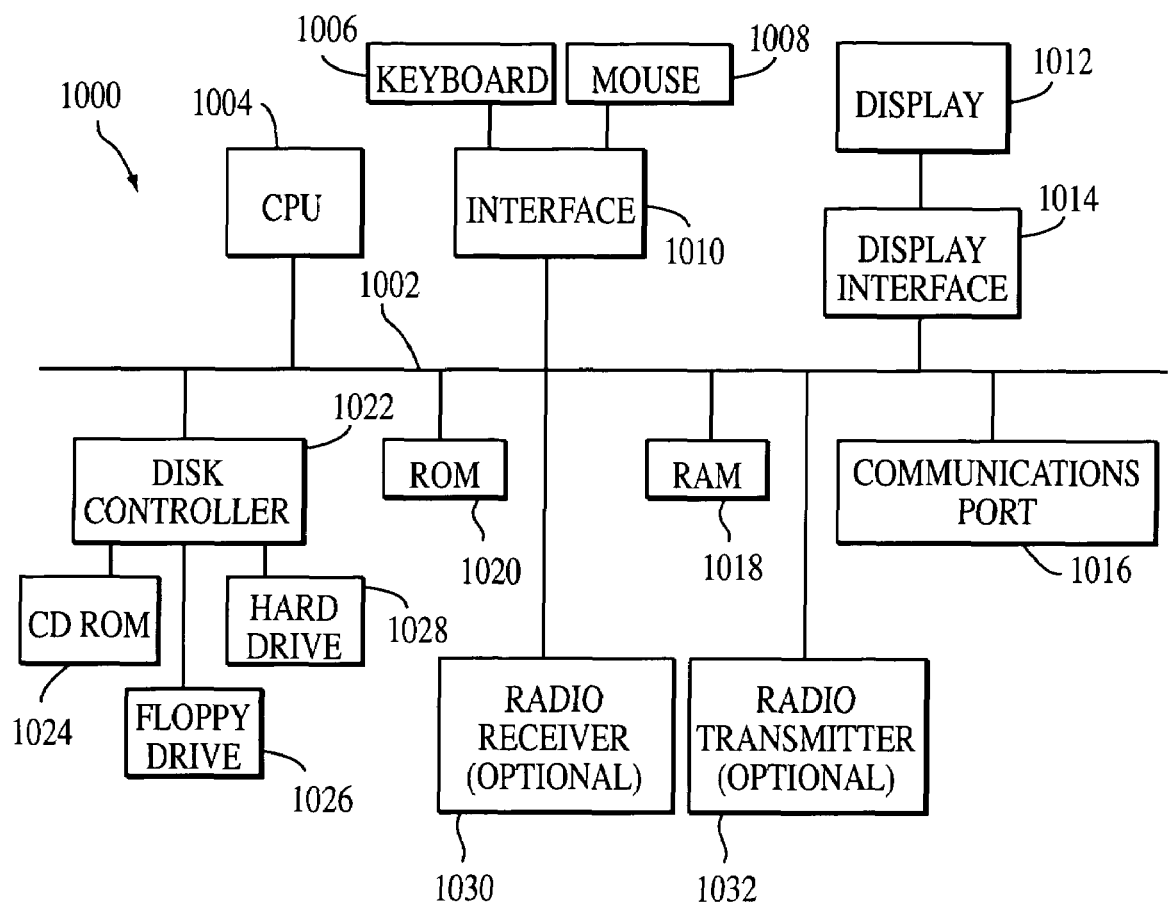
FIG. 10 is a block diagram of a computer system that includes tool representation and access control for use in one or more embodiments of the present invention.

Various aspects of the present invention that can be controlled by a computer can be (and/or be controlled by) any number of control/computer entities, including the one shown in FIG. 10. Referring to FIG. 10 a bus 1002 serves as the main information highway interconnecting the other components of system 1000. CPU 1004 is the central processing unit of the system, performing calculations and logic operations required to execute the processes of embodiments of the present invention as well as other programs.

Read only memory (ROM) 1020 and random access memory (RAM) 1018 constitute the main memory of the system. As contemplated by the present invention, a number of parameters, including, for example, the actual data from the controlled output, the model data indicating a predicted value for the controlled output as used to calculated the model health index, the specification data indicating a target value for the controlled output, and the actual model and/or process health indices as they are calculated, may be stored in the main memory of the system. Therefore, any number of ROM 1020 and/or RAM 1018 may be included in the system to accommodate storage of these parameters. Additionally, the instructions for calculating the model and/or process health indices may also be stored in these main memories.

Disk controller 1022 interfaces one or more disk drives to the system bus 1002. These disk drives are, for example, floppy disk drives 1026, or CD ROM or DVD (digital video disks) drives 1024, or internal or external hard drives 1028. These various disk drives and disk controllers are optional devices.

A display interface 1014 interfaces display 1012 and permits information from the bus 1002 to be displayed on display 1012. Display 1012 can be used in displaying a graphical user interface. Communications with external devices such as the other components of the system described above can occur utilizing, for example, communication port 1016. Optical fibers and/or electrical cables and/or conductors and/or optical communication (e.g., infrared, and the like) and/or wireless communication (e.g., radio frequency (RF), and the like) can be used as the transport medium between the external devices and communication port 1016. Peripheral interface 1010 interfaces the keyboard 1006 and mouse 1008, permitting input data to be transmitted to bus 1002. In addition to these components, system 1000 also optionally includes an infrared transmitter and/or infrared receiver. Infrared transmitters are optionally utilized when the computer system is used in conjunction with one or more of the processing components/stations that transmits/receives data via infrared signal transmission. Instead of utilizing an infrared transmitter or infrared receiver, the computer system may also optionally use a low power radio transmitter 1032 and/or a low power radio receiver 1030. The low power radio transmitter transmits the signal for reception by components of the production process, and receives signals from the components via the low power radio receiver. The low power radio transmitter and/or receiver are standard devices in industry.

Although system 1000 in FIG. 10 is illustrated having a single processor, a single hard disk drive and a single local memory, system 1000 is optionally suitably equipped with any multitude or combination of processors or storage devices. For example, system 1000 may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

Figure 11:
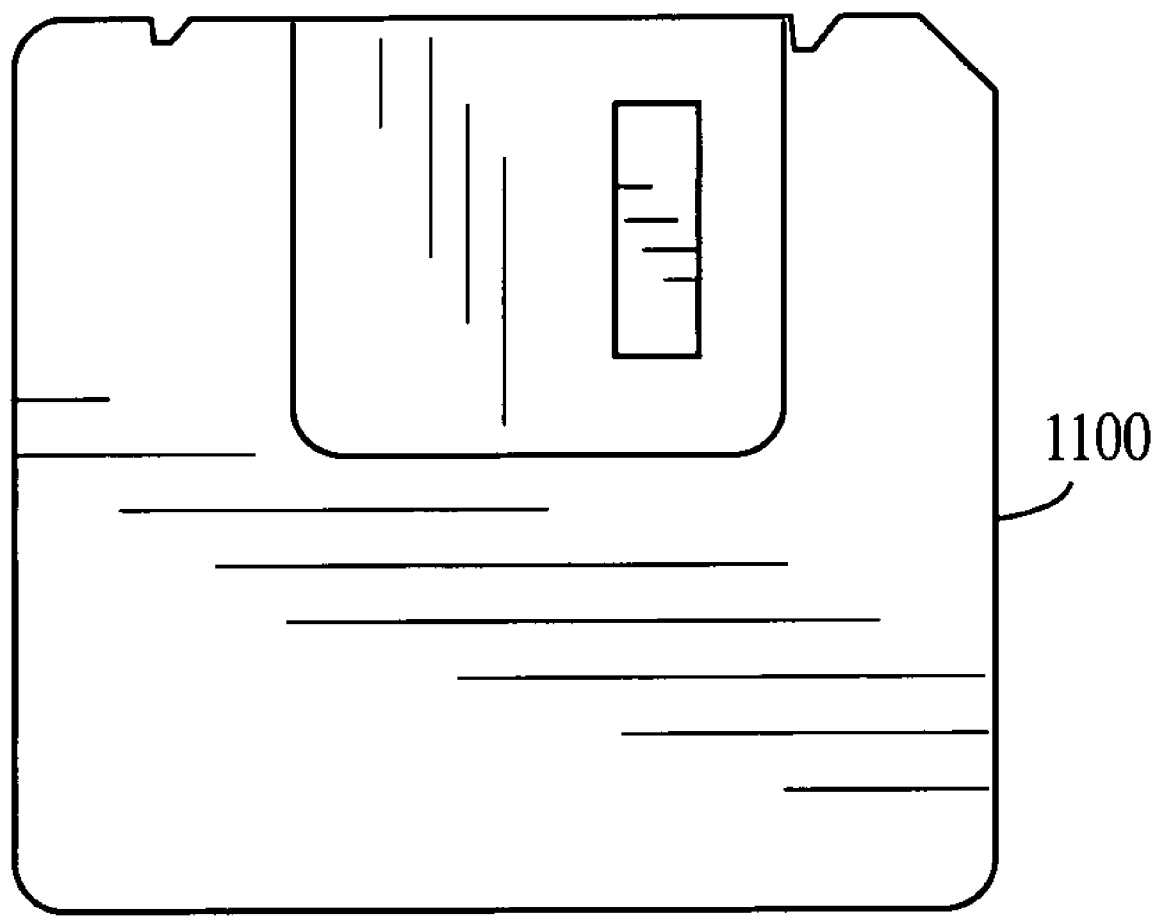
FIG. 11 is an illustration of a floppy disk that may store various portions of the software according to one or more embodiments of the present invention.

FIG. 11 is an illustration of an exemplary computer readable memory medium 1100 utilizable for storing computer readable code or instructions. As one example, medium 1100 may be used with disk drives illustrated in FIG. 10. Typically, memory media such as floppy disks, or a CD ROM, or a digital videodisk will contain, for example, a multi-byte locale for a single byte language and the program information for controlling the above system to enable the computer to perform the functions described herein. Alternatively, ROM 1020 and/or RAM 1018 illustrated in FIG. 10 can also be used to store the program information that is used to instruct the central processing unit CPU 1004 to perform the operations associated with the instant processes. Other examples of suitable computer readable media for storing information include magnetic, electronic, or optical (including holographic) storage, some combination thereof, etc.

In general, it should be emphasized that various components of embodiments of the present invention can be implemented in hardware, software or a combination thereof. In such embodiments, the various components and steps are implemented in hardware and/or software to perform the functions of the present invention. Any presently available or future developed computer software language and/or hardware components can be employed in such embodiments of the present invention. For example, at least some of the functionality mentioned above could be implemented using C, C++, visual basic, Java, or any assembly language appropriate in view of the processor(s) being used. It could also be written in an interpretive environment such as Java and transported to multiple destinations to various users.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

What is claimed is:

1. A method for monitoring performance of process control system for at least one process output, the method comprising the steps of:

receiving from an advanced manufacturing process control system that compensates for changes in the manufacturing process, process performance data for the at least one process output;

calculating, using the process performance data, at least one of a model health index, wherein the model health index indicates an estimate of an ability of a model to predict the behavior of the at least one process output as compared to an expected output, and a process health index, wherein the process health index indicates an estimated probability of violation by the at least one process output of predefined specification limits; and indicating the results of the calculation based on the at least one of the model health index and the process health index.

2. The method of claim 1, wherein the step of calculating the model health index further comprises the steps of:

calculating a variance of a prediction error for a processing performance of the at least one process output; and calculating a ratio of an estimate of a standard deviation of the prediction error to an expected estimate of the prediction error, wherein the standard deviation of the prediction error is derived from the variance of the prediction error.

3. The method of claim 2, wherein the variance of the prediction error indicates a bias between an actual output of the at least process output and the expected output.

4. The method of claim 2, wherein the variance of the prediction error is based on an exponentially weighted moving average.

5. The method of claim 2, wherein the estimate of the standard deviation of the prediction error is based on an exponentially weighted moving average.

6. The method of claim 1, wherein the step of calculating the process health index further comprises the steps of:
calculating a probability for violating specification limits of a processing performance of the at least one process output; and
calculating a ratio of the probability for violating the specification limits to a specified probability limit.

7. The method of claim 2, wherein the step of calculating the process health index further comprises the step of calculating a variance of a target deviation for the processing performance of the at least one process output, wherein the variance of the target deviation indicates a bias between an actual output of the at least one process output and a target output.

8. The method of claim 7, wherein the variance of the target deviation is based on an exponentially weighted moving average.

9. The method of claim 1, further comprising the step of performing a notification function, wherein the notification function comprises sending an indication to a controller that the at least one of the model health index and the process health index is beyond an acceptable point.

10. The method of claim 9, wherein sending an indication to a controller further comprises sending at least one of a page, an electronic mail message, and a message to a wireless personal data assistant.

11. The method of claim 1, further comprising the step of performing a notification function, wherein the notification function comprises halting processing of the at least one process output if the at least one of the model health index and the process health index is beyond an acceptable point.

12. The method of claim 1, further comprising the step of performing a notification function, wherein the notification function further comprises displaying the at least one of the model health index and the process health index in a visual display to allow a controller to assess the process performance of the at least one process output.

13. The method of claim 1, further comprising the step of performing a notification function, wherein the notification function comprises storing the at least one of the model health index and the process health index, such that the at least one of the model health index and the process health index serves as an indication of the processing performance of the at least one process output.

14. The method of claim 13, wherein the notification function further comprises displaying the stored at least one of the model health index and the process health index in a visual display to allow a controller to assess the process performance of the at least one process output.

15. A method for monitoring performance of process control system for at least one process output, the method comprising the steps of:
calculating at least one of a variance of a prediction error for a processing performance of the at least one process output from an advanced manufacturing process control system that compensates for changes in a manufacturing process, and calculating a probability for violating specification limits of the processing performance of the at least one process output, wherein the at least one of the variance and the probability are based on an exponentially weighted moving average;
if the variance of the prediction error is calculated, calculating a model health index, wherein the model health index is a ratio of an exponentially weighted moving average-based estimate of a standard deviation of the prediction error to an expected estimate of the prediction error, and wherein the exponentially weighted moving average-based estimate of the standard deviation of the prediction error is derived from the variance of the prediction error;
if the probability for violating specification limits is calculated, calculating a process health index, wherein the process health index is a ratio of the probability for violating the specification limits to a specified probability limit; and
indicating the results of the calculation based on at least one of the model health index and the process health index.

16. The method of claim 15, further comprising the step of performing a notification function, wherein the notification function comprises sending an indication to a controller that the at least one of the model health index and the process health index is beyond an acceptable point.

17. The method of claim 16, wherein sending an indication to a controller further comprises sending at least one of a page, an electronic mail message, and a message to a wireless personal data assistant.

18. The method of claim 15, further comprising the step of performing a notification function, wherein the notification function comprises halting processing of the at least one process output if the at least one of the model health index and the process health index is beyond an acceptable point.

19. The method of claim 15, further comprising the step of performing a notification function, wherein the notification function further comprises displaying the at least one of the model health index and the process health index in a visual display to allow a controller to assess the process performance of the at least one process output.

20. The method of claim 15, further comprising the step of performing a notification function, wherein the notification function comprises storing the at least one of the model health index and the process health index, such that the at least one of the model health index and the process health index serves as an indication of the processing performance of the at least one process output.

21. The method of claim 20, wherein the notification function further comprises displaying the at least one of the model health index and the process health index in a visual display to allow a controller to assess the process performance of the at least one process output.

22. A method for monitoring performance of process control system for at least one process output, the method comprising the steps of:
receiving process performance data from an advanced manufacturing process control system that compensates for changes in a manufacturing process, for the at least one process output;
calculating at least one of a current model health index, wherein the current model health index indicates an estimate of an ability of a model to predict the behavior of a current one of the at least one process output as compared to an expected output, and a current process health index, wherein the current process health index indicates an estimated probability of violation by a current one of the at least one process output of predefined specification limits;

if the current model health index is calculated, calculating a subsequent model health index, wherein the subsequent model health index indicates an estimate of an ability of a model to predict the behavior of a subsequent one of the at least one process output as compared to an expected output;

if the subsequent model health index is calculated, storing the current model health index and the subsequent model health index, such that comparing the current model health index and the subsequent model health index give an indication of a processing performance of the at least one process output;

if the current process health index is calculated, calculating a subsequent process health index, wherein the subsequent process health index indicates an estimated probability of violation by a subsequent one of the at least one process output of predefined specification limits; and if the subsequent process health index is calculated, storing the current process health index and the subsequent process health index, such that comparing the current process health index and the current process health index gives an indication of the processing performance of the at least one process output.

23. A method for monitoring performance of process control system for at least one process output, the method comprising the steps of:

calculating at least one of a current variance of a prediction error for a processing performance of the at least one process output from an advanced manufacturing process control system that compensates for changes in a manufacturing process, and calculatina a current probability for violating specification limits of the processing performance of the at least one process output, wherein the at least one of the current variance and the current probability are based on an exponentially weighted moving average;

if the current variance of the prediction error is calculated, calculating a current model health index, wherein the current model health index is a ratio of a current exponentially weighted moving average-based estimate of a standard deviation of the prediction error to an expected estimate of the prediction error, and wherein the current exponentially weighted moving average-based estimate of the standard deviation of the prediction error is derived from the current variance of the prediction error;

if the current model health index is calculated, calculating a subsequent model health index, wherein the subsequent model health index is calculated in a substantially similar manner to the current model health index;

if the subsequent model health index is calculated, storing the current model health index and the subsequent model health index, such that comparing the current model health index and the subsequent model health index gives an indication of the processing performance of the at least one process output;

if the current probability for violating specification limits is calculated, calculating a current process health index, wherein the current process health index is a ratio of the probability for violating the specification limits to a probability limit;

if the current process health index is calculated, calculating a subsequent process health index, wherein the subsequent process health index is calculated in a substantially similar manner to the current process health index; and if the subsequent process health index is calculated, storing the current process health index and the subsequent process health index, such that comparing the current process health index and the subsequent process health index gives an indication of the processing performance of the at least one process output.

24. A method for monitoring performance of process control system for a plurality of process outputs, the method comprising the steps of:

calculating at least one of a first model health index, that indicates an estimate of an ability of a model to predict the behavior of at least one process output as compared to an expected output, of a process performance of a first one of the plurality of process outputs from an advanced manufacturing process control system that compensates for changes in a manufacturing process, and calculating a first process health index, that indicates an estimated probability of violation by at least one process output of predefined specification limits, of the process performance of the first one of the plurality of process outputs;

calculating at leasf one of a second model health index, that indicates an estimate of an ability of a model to predict the behavior of at least one process output as compared to an expected output, of the process performance of a second one of the plurality of process outputs and a second process health index, that indicates an estimated probability of violation by at least one process output of predefined specification limits, of the process performance of the second one of the plurality of process outputs;

if the first model health index and the second model health index are calculated, calculating an aggregate model health index of the process performance of the plurality of process outputs; and if the first process health index and the second process health index are calculated, calculating an aggregate process health index of the process performance of the plurality of process outputs.

25. The method of claim 24, wherein the aggregate model health index is calculated using a geometric mean of the first model health index and the second model health index and the aggregate process health index is calculated using a geometric mean of the first process health index and the second process health index.

26. The method of claim 24, further comprising:

calculating at least one of an nth, where n is a number greater than three, model health index of a process performance of a nth one of the plurality of process outputs and a nth process health index of the process performance of the nth one of the plurality of process outputs;

if the first model health index, the second model health index are calculated, and the nth model health index are calculated, calculating the aggregate model health index of the process performance of the plurality of process outputs; and if the first process health index, the second process health index, and the nth process health index are calculated, calculating the aggregate process health index of the process performance of the plurality of process outputs.

27. The method of claim 26, wherein the aggregate model health index is calculated using a geometric mean of the first model health index, the second model health index, and the nth model health index and the aggregate process health index is calculated using a geometric mean of the first process health index, the second process health index, and the nth process health index.

28. A system for monitoring performance of process control system for at least one process output, comprising:
a first memory that stores at least one of a predicted value for process performance of the at least one process output from an advanced manufacturing process control system that compensates for changes in a manufacturing process and a target value for process performance of the at least one process output;
a second memory that stores process performance data of the at least one process output;
a third memory that stores at least one of a model health algorithm and a process health algorithm, wherein the model health algorithm is used to calculate a model health index, that indicates an estimate of an ability of a model to predict the behavior of the at least one process output as compared to an expected output, of the process performance and the process health algorithm is used to calculate a process health index, that indicates an estimated probability of violation by the at least one process output of predefined specification limits, of the process performance; and
a processor, operably connected to the first memory, the second memory and the third memory, that calculates at least one of the model health index using the model health algorithm and the process health index using the process health algorithm, wherein the model health index is calculated based on a comparison of the predicted value and the process performance data of the at least one process output, and wherein the process health index is calculated based on a comparison of the target value and the process performance data of the at least one process output.

29. The system of claim 28, further comprising a user input interface that receives the at least one of the predicted value for process performance of the at least one process output and the target value for the process performance of the at least one process output and stores the at least one of the predicted value and the target value in the first memory.

30. The system of claim 28, wherein the processor is capable of halting processing of the at least one process output if the at least one of the model health index and the process health index is beyond an acceptable point.

31. The system of claim 28, further comprising a communications interface, wherein the processor is capable of sending a notification message to a controller if the at least one of the model health index and the process health index is beyond an acceptable point.

32. The system of claim 31, wherein the communications interface is at least one of a radio transmitter and a communications port.

33. The system of claim 31, wherein the notification message comprises at least one of a page, an electronic mail message, and a message to a wireless personal data assistant.

34. The system of claim 28, further comprising a fourth memory that stores the at least one of the model health index and the process health index, such that the at least one of the model health index and the process health index serves as an indication of the processing performance of the at least one process output.

35. The system of claim 28, further comprising a display that displays the at least one of the model health index and the process health index as a visual display, such that the at least one of the model health index and the process health index serves as an indication of the processing performance of the at least one process output.

36. A system for monitoring performance of process control system for at least one process output, comprising:
first storage means for storing at least one of a predicted value for process performance of the at least one process output from an advanced manufacturing process control system that compensates for changes in a manufacturing process and a target value for process performance of the at least one process output;
second storage means for storing process performance data of the at least one process output;
third storage means for storing at least one of a model health algorithm and a process health algorithm, wherein the model health algorithm is used to calculate a model health index, that indicates an estimate of an ability of a model to predict the behavior of the at least one process output as compared to an expected output, of the process performance and the process health algorithm is used to calculate a process health index, that indicates an estimated probability of violation by the at least one process output of predefined specification limits, of the process performance; and
processing means, operably connected to the first storage means, the second storage means and the third storage means, that calculates at least one of the model health index using the model health algorithm and the process health index using the process health algorithm, wherein the model health index is calculated based on a comparison of the predicted value and the process performance data of the at least one process output, and wherein the process health index is calculated based on a comparison of the target value and the process performance data of the at least one process output.

37. The system of claim 36, further comprising user input means for receiving the at least one of the predicted value for process performance of the at least one process output and the target value for the process performance of the at least one process output and storing the at least one of the predicted value and the target value in the first storage means.

38. The system of claim 36, further comprising control interface means between the processor and the at least one process output for enabling the processing means to halt processing of the at least one process output if the at least one of the model health index and the process health index is beyond an acceptable point.

39. The system of claim 36, further comprising communications interface means for enabling the processing means to send a notification message to a controller if the at least one of the model health index and the process health index is beyond an acceptable point.

40. The system of claim 39, wherein the notification message comprises at least one of a page, an electronic mail message, and a message to a wireless personal data assistant.

41. The system of claim 36, further comprising fourth storage means for storing the at least one of the model health index and the process health index, such that the at least one of the model health index and the process health index serves as an indication of the processing performance of the at least one process output.

42. The system of claim 36, further comprising display means for displaying the at least one of the model health index and the process health index as a visual display, such that the at least one of the model health index and the process health index serves as an indication of the processing performance of the at least one process output.

43. A system for monitoring performance of process control system for at least one process output, comprising:
   means for receiving process performance data from an advanced manufacturing process control system that compensates for changes in a manufacturing process, for the at least one process output;
   means for calculating at least one of a model health index, wherein the model health index indicates an estimate of an ability of a model to predict the behavior of the at least one process output as compared to an expected output, and a process health index, wherein the process health index indicates an estimated probability of violation by the at least one process output of predefined specification limits; and
   means for indicating the results of the calculation based on the at least one of the model health index and the process health index.

44. A system for monitoring performance of an process control system for at least one process output, the system comprising:
   at least one tool, which measures the at least one process output from an advanced manufacturing process control system that compensates for changes in a manufacturing process; and
   a controller, coupled to the at least one tool, which provides for central control of the at least one tool, the controller implementing instructions for controlling the at least one tool, the instructions comprising:
      receiving process performance data for the at least one process output;
      calculating at least one of a model health index, wherein the model health index indicates an estimate of an ability of a model to predict the behavior of the at least one process output as compared to an expected output, and a process health index, wherein the process health index indicates an estimated probability of violation by the at least one process output of predefined specification limits; and
      indicating the results of the calculation based on the at least one of the model health index and the process health index.

45. A system for monitoring performance of process control system for at least one process output, the system comprising:
   at least one tool, which measures the at least one process output from an advanced manufacturing process control system that compensates for changes in a manufacturing process; and
   a controller, coupled to the at least one tool, which provides for central control of the at least one tool, the controller implementing instructions for controlling the at least one tool, the instructions comprising:
      calculating at least one of a variance of a prediction error for a processing performance of the at least one process output and a probability for violating specification limits of the processing performance of the at least one process output, wherein the at least one of the variance and the probability are based on an exponentially weighted moving average;
      if the variance of the prediction error is calculated, calculating a model health index, wherein the model health index is a ratio of an exponentially weighted moving average-based estimate of a standard deviation of the prediction error to an expected estimate of the prediction error, and wherein the exponentially weighted moving average-based estimate of the standard deviation of the prediction error is derived from the variance of the prediction error;
      if the probability for violating specification limits is calculated, calculating a process health index, wherein the process health index is a ratio of the probability for violating the specification limits to a specified probability limit; and
      performing a notification function based on at least one of the model health index and the process health index.

46. A system for monitoring performance of an process control system for at least one process output, the system comprising:
   at least one tool, which measures the at least one process output from an advanced manufacturing process control system that compensates for changes in a manufacturing process; and
   a controller, coupled to the at least one tool, which provides for central control of the at least one tool, the controller implementing instructions for controlling the at least one tool, the instructions comprising:
      receiving process performance data for the at least one process output;
      calculating at least one of a current model health index, wherein the current model health index indicates an estimate of an ability of a model to predict the behavior of a current one of the at least one process output as compared to an expected output, and a current process health index, wherein the current process health index indicates an estimated probability of violation by a current one of the at least one process output of predefined specification limits;
      if the current model health index is calculated, calculating a subsequent model health index, wherein the subsequent model health index indicates an estimate of an ability of a model to predict the behavior of a subsequent one of the at least one process output as compared to an expected output;
      if the subsequent model health index is calculated, storing the current model health index and the subsequent model health index, such that comparing the current model health index and the subsequent model health index give an indication of a processing performance of the at least one process output;
      if the current process health index is calculated, calculating a subsequent process health index, wherein the subsequent process health index indicates an estimated probability of violation by a subsequent one of the at least one process output of predefined specification limits; and
      if the subsequent process health index is calculated, storing the current process health index and the subsequent process health index, such that comparing the current process health index and the current process health index gives an indication of the processing performance of the at least one process output.

47. A system for monitoring performance of process control system for at least one process output, the system comprising:
   at least one tool, which measures the at least one process output from an advanced manufacturing process control system that compensates for changes in a manufacturing process; and
   a controller, coupled to the at least one tool, which provides for central control of the at least one tool, the controller implementing instructions for controlling the at least one tool, the instructions comprising:

calculating at least one of a current variance of a prediction error for a processing performance of the at least one process output and a current probability for violating specification limits of the processing performance the at least one process output, wherein the at least one of the current variance and the current probability are based on an exponentially weighted moving average;

if the current variance of the prediction error is calculated, calculating a current model health index, wherein the current model health index is a ratio of a current exponentially weighted moving average-based estimate of a standard deviation of the prediction error to an expected estimate of the prediction error, and wherein the current exponentially weighted moving average-based estimate of the standard deviation of the prediction error is derived from the current variance of the prediction error;

if the current model health index is calculated, calculating a subsequent model health index, wherein the subsequent model health index is calculated in a substantially similar manner to the current model health index;

if the subsequent model health index is calculated, storing the current model health index and the subsequent model health index, such that comparing the current model health index and the subsequent model health index gives an indication of the processing performance of the at least one process output;

if the current probability for violating specification limits is calculated, calculating a current process health index, wherein the current process health index is a ratio of the probability for violating the specification limits to a probability limit;

if the current process health index is calculated, calculating a subsequent process health index, wherein the subsequent process health index is calculated in a substantially similar manner to the current process health index; and if the subsequent process health index is calculated, storing the current process health index and the subsequent process health index, such that comparing the current process health index and the subsequent process health index gives an indication of the processing performance of the at least one process output.

48. A system for monitoring performance of process control system for at least one process output, the system comprising:

at least one tool, which measures the at least one process output from an advanced manufacturing process control system that compensates for changes in a manufacturing process; and a controller, coupled to the at least one tool, which provides for central control of the at least one tool, the controller implementing instructions for controlling the at least one tool, the instructions comprising:

calculating at least one of a first model health index, that indicates an estimate of an ability of a model to predict the behavior of the at least one process output as compared to an expected output, of a process performance of a first one of the plurality of process outputs and a first process health index, that indicates an estimated probability of violation by the at least one process output of predefined specification limits, of the process performance of the first one of the plurality of process outputs;

calculating at least one of a second model health index, that indicates an estimate of an ability of a model to predict the behavior of the at least one process output as compared to an expected output, of the process performance of a second one of the plurality of process outputs and a second process health index, that indicates an estimated probability of violation by the at least one process output of predefined specification limits, of the process performance of the second one of the plurality of process outputs;

if the first model health index and the second model health index are calculated, calculating an aggregate model health index of the process performance of the plurality of process outputs; and if the first process health index and the second process health index are calculated, calculating an aggregate process health index of the process performance of the plurality of process outputs.

49. A computer-readable medium of instructions for monitoring performance of process control system for at least one process output, the instructions comprising:

receiving process performance data for the at least one process output from an advanced manufacturing process control system that compensates for changes in a manufacturing process;

calculating at least one of a model health index, wherein the model health index indicates an estimate of an ability of a model to predict the behavior of the at least one process output as compared to an expected output, and a process health index, wherein the process health index indicates an estimated probability of violation by the at least one process output of predefined specification limits; and indicating the results of the calculation based on the at least one of the model health index and the process health index.

50. A computer-readable medium of instructions for monitoring performance of process control system for at least one process output, the instructions comprising:

calculating at least one of a variance of a prediction error for a processing performance of the at least one process output from an advanced manufacturing process control system that compensates for changes in a manufacturing process, and calculating a probability for violating specification limits of the processing performance of the at least one process output, wherein the at least one of the variance and the probability are based on an exponentially weighted moving average;

if the variance of the prediction error is calculated, calculating a model health index, wherein the model health index is a ratio of an exponentially weighted moving average-based estimate of a standard deviation of the prediction error to an expected estimate of the prediction error, and wherein the exponentially weighted moving average-based estimate of the standard deviation of the prediction error is derived from the variance of the prediction error;

if the probability for violating specification limits is calculated, calculating a process health index, wherein the process health index is a ratio of the probability for violating the specification limits to a specified probability limit; and indicating the results of the calculation based on at least one of the model health index and the process health index.

51. A computer-readable medium of instructions for monitoring performance of process control system for at least one process output, the instructions comprising:

receiving process performance data for the at least one process output from an advanced manufacturing process control system that compensates for changes in a manufacturing process;

calculating at least one of a current model health index, wherein the current model health index indicates an estimate of an ability of a model to predict the behavior of a current one of the at least one process output as compared to an expected output, and a current process health index, wherein the current process health index indicates an estimated probability of violation by a current one of the at least one process output of predefined specification limits;

if the current model health index is calculated, calculating a subsequent model health index, wherein the subsequent model health index indicates an estimate of an ability of a model to predict the behavior of a subsequent one of the at least one process output as compared to an expected output;

if the subsequent model health index is calculated, storing the current model health index and the subsequent model health index, such that comparing the current model health index and the subsequent model health index give an indication of a processing performance of the at least one process output;

if the current process health index is calculated, calculating a subsequent process health index, wherein the subsequent process health index indicates an estimated probability of violation by a subsequent one of the at least one process output of predefined specification limits; and if the subsequent process health index is calculated, storing the current process health index and the subsequent process health index, such that comparing the current process health index and the current process health index gives an indication of the processing performance of the at least one process output.

52. A computer-readable medium of instructions for monitoring performance of process control system for at least one process output, the instructions comprising:

calculating at least one of a current variance of a prediction error for a processing performance of the at least one process output from an advanced manufacturing process control system that compensates for changes in a manufacturing process, and calcuating a current probability for violating specification limits ofthe processing performance the at least one process output, wherein the at least one of the current variance and the current probability are based on an exponentially weighted moving average;

if the current variance of the prediction error is calculated, calculating a current model health index, wherein the current model health index is a ratio of a current exponentially weighted moving average-based estimate of a standard deviation of the prediction error to an expected estimate of the prediction error, and wherein the current exponentially weighted moving average-based estimate of the standard deviation of the prediction error is derived from the current variance of the prediction error;

if the current model health index is calculated, calculating a subsequent model health index, wherein the subsequent model health index is calculated in a substantially similar manner to the current model health index;

if the subsequent model health index is calculated, storing the current model health index and the subsequent model health index, such that comparing the current model health index and the subsequent model health index gives an indication of the processing performance of the at least one process output;

if the current probability for violating specification limits is calculated, calculating a current process health index, wherein the current process health index is a ratio of the probability for violating the specification limits to a probability limit;

if the current process health index is calculated, calculating a subsequent process health index, wherein the subsequent process health index is calculated in a substantially similar manner to the current process health index; and if the subsequent process health index is calculated, storing the current process health index and the subsequent process health index, such that comparing the current process health index and the subsequent process health index gives an indication of the processing performance of the at least one process output.

53. A computer-readable medium of instructions for monitoring performance of process control system for at least one process output, the instructions comprising:

calculating at least one of a first model health index, that indicates an estimate of an ability of a model to predict the behavior of the at least one process output as compared to an expected output, of a process performance of a first one of the plurality of process outputs from an advanced manufacturing process control system that compensates for changes in a manufacturing process, and calculating a first process health index, that indicates an estimated probability of violation by the at least one process output of predefined specification limits, of the process performance of the first one of the plurality of process outputs;

calculating at least one of a second model health index, that indicates an estimate of an ability of a model to predict the behavior of the at least one process output as compared to an expected output, of the process performance of a second one of the plurality of process outputs and a second process health index, that indicates an estimated probability of violation by the at least one process output of predefined specification limits, of the process performance of the second one of the plurality of process outputs;

if the first model health index and the second model health index are calculated, calculating an aggregate model health index of the process performance of the plurality of process outputs; and if the first process health index and the second process health index are calculated, calculating an aggregate process health index of the process performance of the plurality of process outputs.

* * * * *